United States Patent
Shinagawa et al.

(10) Patent No.: US 11,203,992 B2
(45) Date of Patent: Dec. 21, 2021

(54) VAPORIZED-FUEL TREATING APPARATUS

(71) Applicant: AISAN KOGYO KABUSHIKI KAISHA, Obu (JP)

(72) Inventors: Masanobu Shinagawa, Nagoya (JP); Yoshihiko Honda, Obu (JP); Shota Tsukamoto, Kariya (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 212 days.

(21) Appl. No.: 16/442,599

(22) Filed: Jun. 17, 2019

(65) Prior Publication Data

US 2020/0018247 A1 Jan. 16, 2020

(30) Foreign Application Priority Data

Jul. 11, 2018 (JP) .............................. JP2018-131408

(51) Int. Cl.
*F02D 41/00* (2006.01)
*F02M 31/02* (2019.01)
*F02M 25/08* (2006.01)

(52) U.S. Cl.
CPC ......... *F02D 41/003* (2013.01); *F02M 25/089* (2013.01); *F02M 25/0854* (2013.01); *F02M 25/0872* (2013.01); *F02M 31/02* (2013.01); *F02D 2200/0606* (2013.01); *F02M 25/08* (2013.01); *F02M 2025/0881* (2013.01); *Y02T 10/12* (2013.01)

(58) Field of Classification Search
CPC .......... F02D 41/003; F02D 2200/0606; F02M 31/02; F02M 25/0872; F02M 25/0854; F02M 25/089; F02M 25/08; F02M 2025/0881; Y02T 10/12
See application file for complete search history.

(56) References Cited

U.S. PATENT DOCUMENTS

| | | | |
|---|---|---|---|
| 5,317,869 A * | 6/1994 | Takeuchi | F01N 3/2026 60/300 |
| 2007/0137622 A1 | 6/2007 | Koyama | |
| 2009/0084363 A1 * | 4/2009 | Reddy | F02M 25/0854 123/520 |
| 2012/0312281 A1 | 12/2012 | Tsutsumi et al. | |
| 2013/0298878 A1 * | 11/2013 | Kim | F02M 25/0854 123/519 |

(Continued)

FOREIGN PATENT DOCUMENTS

| | | |
|---|---|---|
| CN | 103883435 A | 6/2014 |
| CN | 106468226 A | 3/2017 |

(Continued)

OTHER PUBLICATIONS

Mar. 29, 2021 Office Action issued in Chinese Patent Application No. 201910623476.3.

*Primary Examiner* — Jessica Cahill
*Assistant Examiner* — Patrick C Williams
(74) *Attorney, Agent, or Firm* — Oliff PLC

(57) ABSTRACT

A vaporized-fuel treating apparatus includes a pump part for controlling a flow of purge gas and a heating part for controlling driving of the pump part and for generating heat. At least a part of the heating part is placed to be exposed in an atmosphere passage. The pump part is either placed in the purge passage or arranged connecting to the purge passage.

12 Claims, 19 Drawing Sheets

XX: PURGE CONCENTRATION ESTIMATING PART
YY: RAPID HEATING CONTROL PART

(56) References Cited

U.S. PATENT DOCUMENTS

| | | | |
|---|---|---|---|
| 2014/0165972 A1 | 6/2014 | Aso | |
| 2015/0107561 A1* | 4/2015 | Makino | F02M 25/0854 123/519 |
| 2017/0051705 A1 | 2/2017 | Aso | |
| 2017/0370306 A1* | 12/2017 | Dudar | F02D 41/0032 |

FOREIGN PATENT DOCUMENTS

| | | |
|---|---|---|
| DE | 10 2016 010 837 A1 | 3/2018 |
| JP | 2007-170221 A | 7/2007 |
| JP | 2013-002287 A | 1/2013 |
| JP | 2014-101872 A | 6/2014 |
| JP | 2014-118948 A | 6/2014 |
| JP | 2014-136971 A | 7/2014 |

* cited by examiner

VAPORIZED-FUEL TREATING APPARATUS

CROSS-REFERENCE TO RELATED APPLICATIONS

This application is based upon and claims the benefit of priority from the prior Japanese Patent Applications No. 2018-131408 filed on Jul. 11, 2018, the entire contents of which are incorporated herein by reference.

BACKGROUND

Technical Field

The present disclosure relates to a vaporized-fuel treating apparatus for supplying vaporized fuel generated in a fuel tank to an internal combustion engine via an intake passage.

Related Art

As a conventional art of the above type, there is a vaporized-fuel treating apparatus disclosed in Japanese unexamined patent application publication No. 2007-170221 (JP 2007-170221A). This apparatus includes a canister communicating with an atmosphere passage and a purge passage. Further, a pump serving as a fluid control unit is placed in the purge passage to generate a flow of purge gas.

SUMMARY

Technical Problems

In the vaporized-fuel treating apparatus disclosed in JP2007-170221A in which the pump is placed in the purge passage, the purge concentration (i.e., the concentration of vaporized fuel contained in the purge gas) can be estimated based on for example a differential pressure between the front and the rear of the pump. However, since the pump is located in the purge passage, the pump could not be cooled by the air that flows through the atmosphere passage. In addition, the air that flows in the canister is not heated by the heat generated by driving of the pump and thus desorption, or purge, of the vaporized fuel in the canister could not be promoted by the air.

The present disclosure has been made to address the above problems and has a purpose to provide a vaporized-fuel treating apparatus including a fluid control part placed in such a position as to enable estimation of a purge concentration and cool a part (e.g., a heating part) for controlling driving of a fluid control part and promote desorption of vaporized fuel in a canister.

Means of Solving the Problems

To achieve the above-mentioned purpose, one aspect of the present disclosure provides a vaporized-fuel treating apparatus including: a purge passage configured to allow purge gas to flow therethrough; an atmosphere passage configured to allow air to flow therethrough; a canister communicating with the purge passage and the atmosphere passage; a fluid control part configured to control a flow of a fluid; and a heating part configured to control driving of the fluid control part and generate heat, wherein the heating part is placed so that at least a part of the heating part is exposed in the atmosphere passage, and the fluid control part is either (i) placed in the purge passage or (ii) placed connecting to the purge passage.

The above configuration can cool the heating part and further promote desorption of vaporized fuel in the canister by heating the air that flows in the canister. Furthermore, the fluid control part is configured to allow purge gas to flow therethrough, so that the purge concentration of vaporized fuel in the purge gas can be estimated based on a differential pressure between the front and rear of the fluid control part.

According to the vaporized-fuel treating apparatus in the present disclosure, it is possible to cool the part (the heating part) for controlling driving of the fluid control part and promote or facilitate desorption of vaporized fuel in the canister while the fluid control part is placed to enable estimation of the purge concentration.

DETAILED DESCRIPTION OF THE EXEMPLARY EMBODIMENTS

A detailed description of an embodiment of a vaporized-fuel treating apparatus which is one of typical embodiments of this disclosure will now be given referring to the accompanying drawings.

Outline of Vaporized-Fuel Treating Apparatus

The outline of a vaporized-fuel treating apparatus 1 in the present embodiment will be first described below. This vaporized-fuel treating apparatus 1 is configured to be mounted in a vehicle, such as a car.

Figure 1:
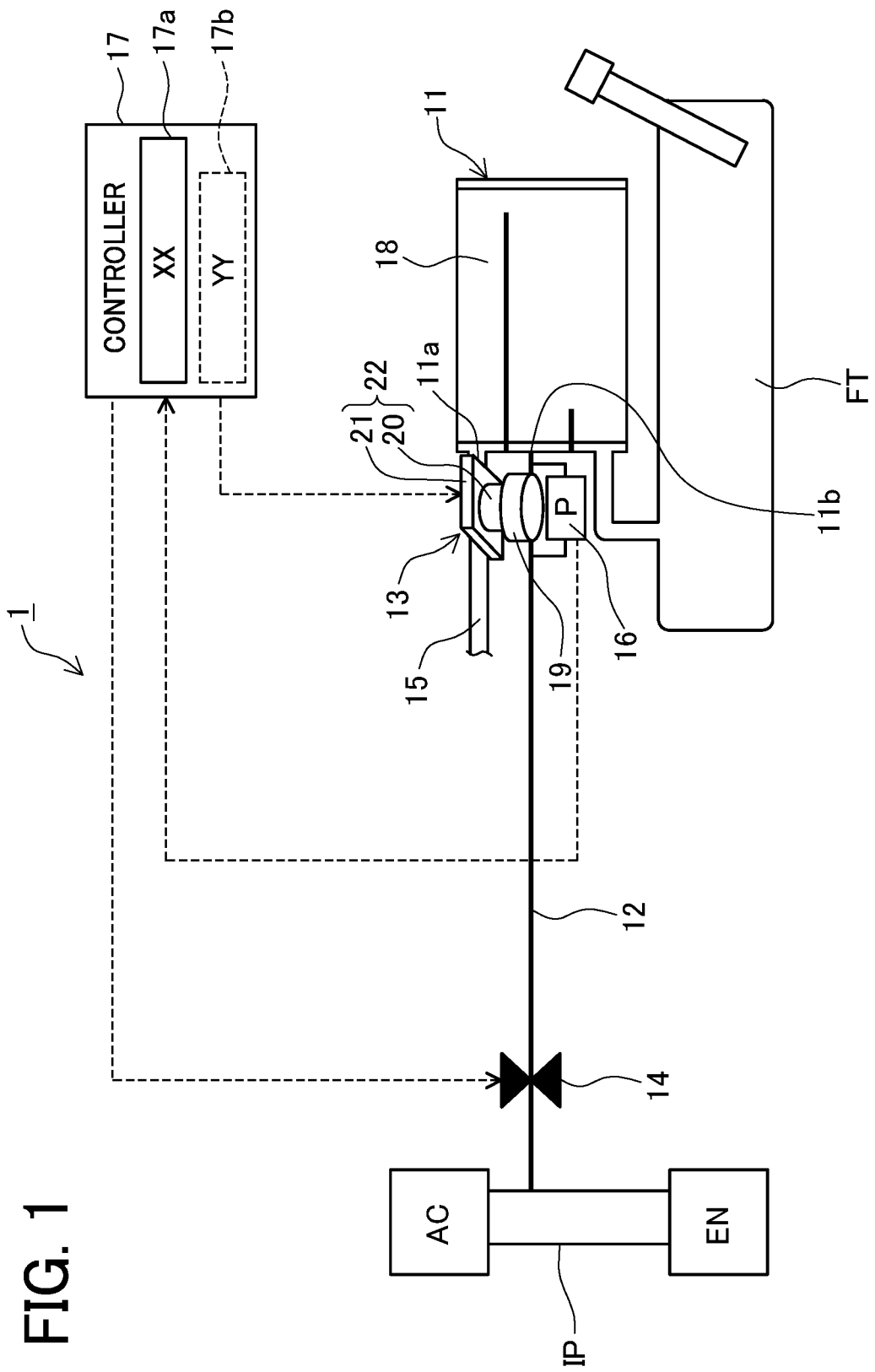
FIG. 1 is a schematic configuration view of a vaporized-fuel treating apparatus and its peripheral equipment in a present embodiment.

Herein, as shown in FIG. 1, an engine EN (an internal-combustion engine) mounted in a vehicle is connected to an intake passage IP for supplying air (intake air) to the engine EN. An air cleaner AC is provided on an upstream side in the intake passage IP, i.e., on an upstream side in a flowing direction of the intake air, to remove foreign matters from the air that flows in the intake passage IP. Accordingly, through the intake passage IP, the air having passed through the air cleaner AC is sucked toward the engine EN.

The vaporized-fuel treating apparatus 1 in the present embodiment is an apparatus for supplying vaporized fuel stored in a fuel tank FT to the engine EN via the intake passage IP. Specifically, the vaporized-fuel treating apparatus 1 includes a canister 11, a purge passage 12, a purge pump 13, a purge valve 14, an atmosphere passage 15, a pressure detecting unit 16, a controller 17, and others, as shown in FIG. 1.

The canister 11 is connected to the fuel tank FT and configured to store vaporized fuel that flows therein from the fuel tank FT. The canister 11 further communicates with the purge passage 12 and the atmosphere passage 15. The canister 11 contains activated carbon 18.

In the present embodiment, the canister 11 is configured to cause the fluid that flows in the canister 11 to pass through a U-shaped flow path from an atmosphere port 11a connected to the atmosphere passage 15 to a purge port 11b connected to the purge passage 12.

The purge passage 12 is connected to the canister 11 and the intake passage IP. Accordingly, the purge gas (namely, the gas that contains vaporized fuel) flowing out of the canister 11 is allowed to pass through the purge passage 12 to the intake passage IP.

The purge pump 13 is a fluid control unit for controlling a flow of the purge gas flowing through the purge passage 12. To be specific, the purge pump 13 pumps out the purge gas froth the canister 11 to the purge passage 12 so that the purge gas delivered into the purge passage 12 is then supplied to the intake passage IP. Since the purge passage 12 and the atmosphere passage 15 communicate with each other through the canister 11, when a flow of the purge gas is generated in the purge passage 12 by the purge pump 13, a flow of air is also generated in the atmosphere passage 15.

The purge pump 13 includes a pump part 19, a motor part 20, and a circuit part 21. The pump part 19 is a fluid control part for controlling a flow of a fluid. In the present embodiment, the pump part 19 is placed in the purge passage 12 and operated to control a flow of the purge gas that flows in the purge passage 12. The motor part 20 and the circuit part 21 are configured to control driving of the pump part 19. To be concrete, the motor part 20 is provided with a motor (a drive part) for driving the pump part 19. On the other hand, the circuit part 21 includes a circuit 25 (see FIG. 7) to control driving of the motor of the motor part 20.

Furthermore, the motor part 20 and the circuit part 21 serve as a heating part for generating heat for example during driving of the pump part 19. Therefore, the following description is given assuming that the motor part 20 and the circuit part 21 are referred together as a heating part 22. Specifically, the purge pump 13 includes the pump part 19 and the heating part 22 as components. The purge pump 13 will be described in detail later.

The purge valve 14 is placed in the purge passage 12, on a downstream side of the purge pump 13 (i.e., on the downstream side in the flowing direction of purge gas), that is, between the purge pump 13 and the intake passage IP. During closing of the purge valve 14, that is, while the purge valve 14 is in a closed state, the purge gas in the purge passage 12 is stopped by the purge valve 14 from flowing toward the intake passage IP. In contrast, during opening of the purge valve 14, that is, while the purge valve 14 is in an open state, the purge gas in the purge passage 12 is allowed to flow toward the intake passage IP.

The atmosphere passage 15 has one end that opens to atmosphere and the other end that is connected to the canister 11 to provide communication between the canister 11 and atmosphere. The atmosphere passage 15 thus allows air taken from atmosphere to flow therein.

The pressure detecting unit 16 is placed in the purge passage 12 and configured to detect a differential pressure between the front and the rear of the pump part 19, i.e., a differential pressure in the purge passage 12 between upstream and downstream (i.e., between input and output) of the pump part 19.

The controller 17 is a part of an ECU (not shown) mounted in a vehicle and is placed integral with other parts of the ECU, such as a part for controlling the engine EN. The controller 17 also may be placed separately from the other portions of the ECU. The controller 17 includes a CPU and memories such as a ROM and a RAM. The controller 17 is configured to control the vaporized-fuel treating apparatus 1 according to programs stored in advance in the memories.

For example, the controller 17 is configured to control the purge pump 1 and the purge valve 14. For controlling the purge valve 14, for example, the controller 17 performs duty control. In this case, for instance, the controller 17 adjusts a duty ratio of signals outputted to the purge valve 14 to adjust the time of opening the purge valve 14. The controller 17 also obtains a detection result on the differential pressure between the front and the rear of the pump part 19 from the pressure detecting unit 16.

The controller 17 includes a purge concentration estimating part 17a configured to estimate the purge concentration (i.e., the concentration of vaporized fuel contained in the purge gas) based on the differential pressure between the front and rear of the pump part 19 detected by the pressure detecting unit 16.

In the vaporized-fuel treating apparatus 1 configured as above, when a predetermined condition for purge control is satisfied during running of the engine EN, the controller 17 controls the purge pump 13 and the purge valve 14 to perform the purge control. This "purge control" is configured to introduce purge gas from the canister 11 to the intake passage IP through the purge passage 12. When the purge control is performed in the above manner, air is caused to flow from atmosphere into the canister 11 through the atmosphere passage 15.

During execution of the purge control, the engine EN is supplied with the air drawn into the intake passage IP, the fuel injected from the fuel tank FT through an injector (not shown), and the purge gas supplied into the intake passage IP under the purge control. The controller 17 adjusts the injection time of the injector and the duty ratio of the purge valve 14 to adjust the air-fuel ratio (A/F) for the engine EN to an optimal air-fuel ratio (e.g., an ideal air-fuel ratio).

Purge Pump

The purge pump 13 will be described below.

Figure 18:
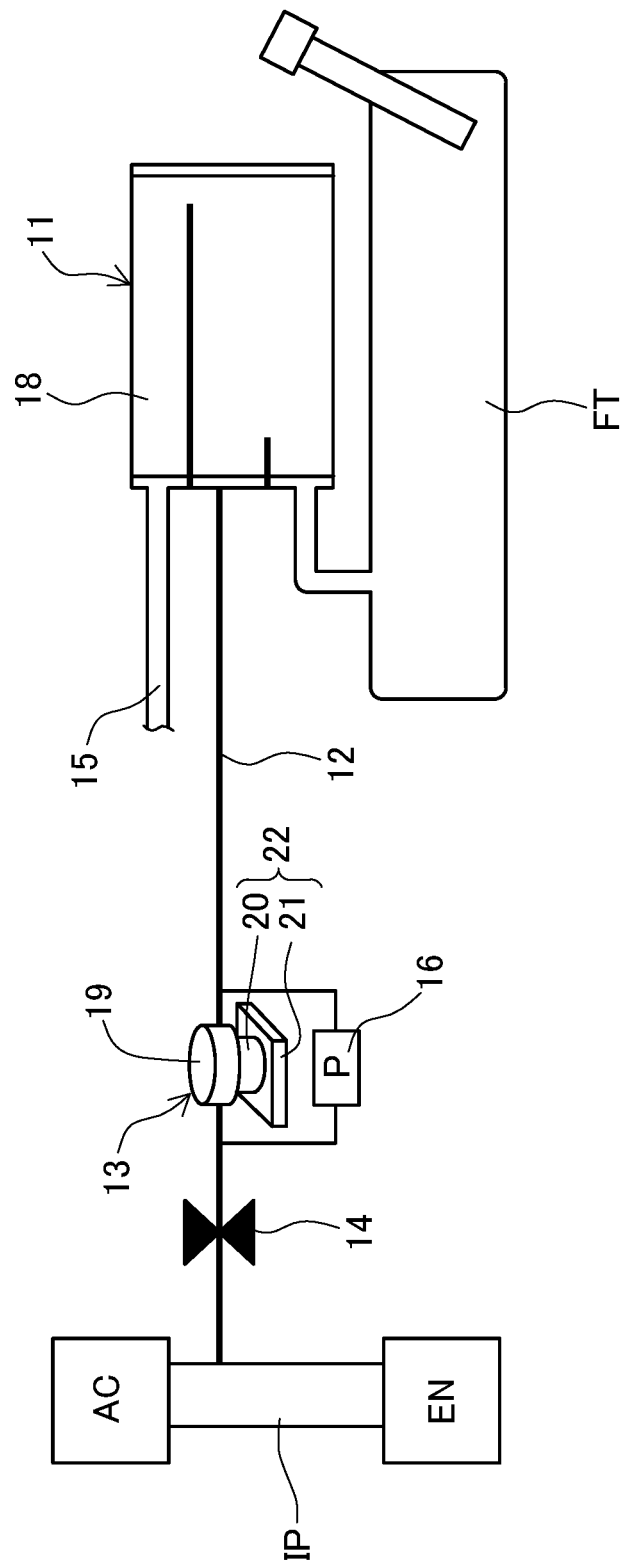
FIG. 18 is a diagram showing Comparative example 1 of the purge pump.

As Comparative example 1 of the purge pump 13, it is assumed such that the purge pump 13 is placed only in the purge passage 12 as shown in FIG. 18. In this case, the purge gas flows through the pump part 19 of the purge pump 13 and thus the purge concentration can be estimated for example based on a differential pressure between the front and the rear of the pump part 19 detected by the pressure detecting unit 16.

However, the purge pump 13 is located downstream of the canister 11 and consequently it is impossible to heat the inside of the canister 11 by utilization of heat generated in the heating part 22 (i.e., the motor part 20 and the circuit part 21) of the purge pump 13 to thereby promote desorption of vaporized fuel in the canister 11. The wording "desorption of vaporized fuel in the canister 11" indicates that vaporized fuel adsorbed to the activated carbon 18 in the canister 11 is caused to desorb from the activated carbon 18.

Figure 19:
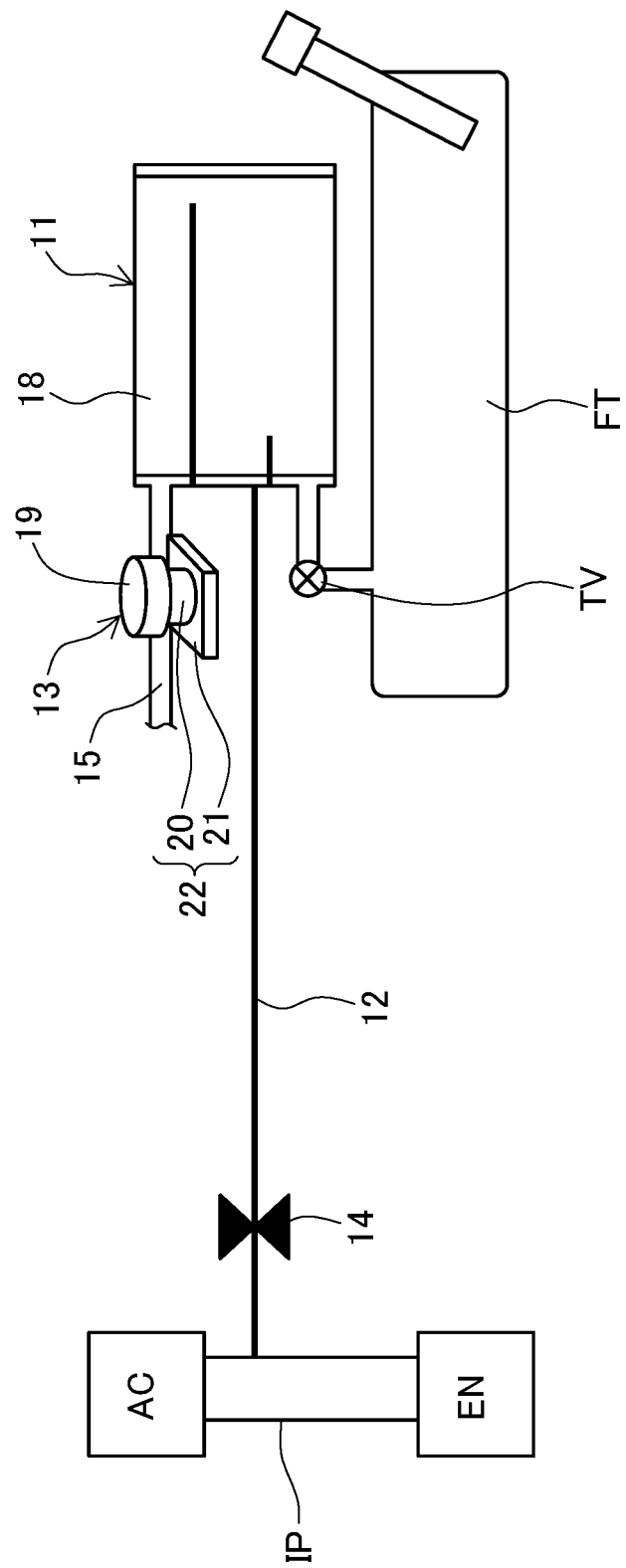
FIG. 19 is a diagram showing Comparative example 2 of the purge pump.

As Comparative example 2, it is assumed that purge pump 13 is placed only in the atmosphere passage 15 as shown in FIG. 19. In this case, the inside of the canister 11 can be heated by utilization of heat generated in the heating part 22 of the purge pump 13 to thereby promote desorption of vaporized fuel in the canister 11. Specifically, this configuration in Comparative example 2 can perform heat exchange between the air (purge air) flowing through the atmosphere passage 15 and the heat generated in the heating part 22 to heat the air flowing from the atmosphere passage 15 into the canister 11, thereby heating the inside of the canister 11 and stimulating the desorption of the vaporized fuel in the canister 11.

However, since the air flows in the pump part 19 of the purge pump 13, it is difficult to estimate the purge concentration based on a differential pressure between the front and the rear of the pump part 19. In this configuration, further, the inside of a fuel tank FT may be excessively pressurized during operation of the purge pump 13. To protect the fuel tank FT, therefore, a tank pressurization preventing valve TV has to be provided between the canister 11 and the fuel tank FT to prevent the inside of the fuel tank FT from undergoing pressurization.

In the present embodiment, in contrast, in a zone where the purge passage 12 and the atmosphere passage 15 are arranged side by side as shown in FIG. 1, the purge pump 13 is placed across both the purge passage 12 and the atmosphere passage 15. To be concrete, the purge pump 13 is located in a position which will be mentioned in the following Examples.

EXAMPLE 1

Figure 2:
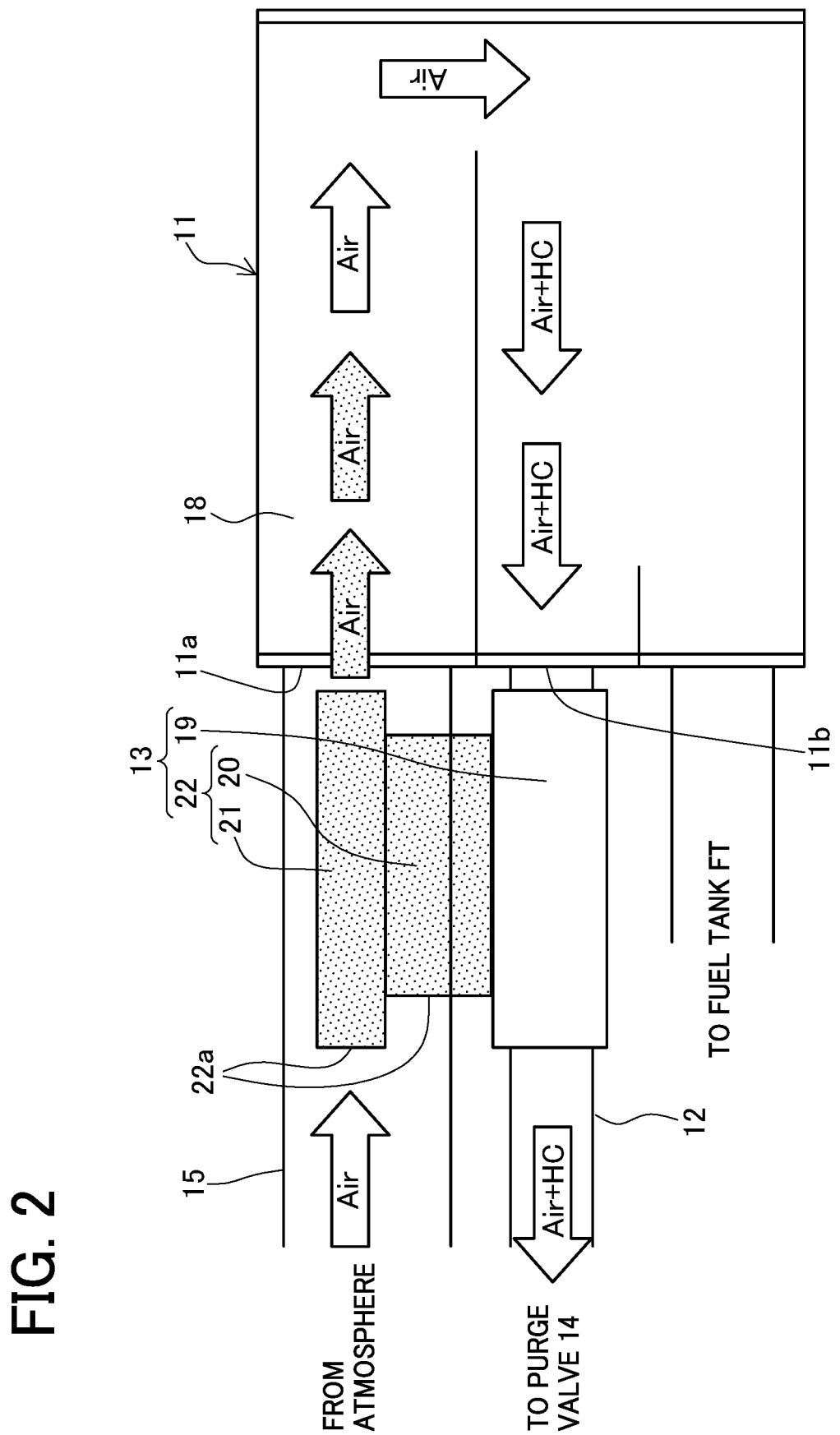
FIG. 2 is a diagram showing Example 1 of a purge pump.

In Example 1, as shown in FIG. 2, the pump part 19 of the purge pump 13 is placed in the purge passage 12. To be concrete, the pump part 19 is located on an upstream side of the purge valve 14 in the purge passage 12, that is, on an upstream side in a flowing direction of purge gas.

Accordingly, the purge gas (indicated by arrows labeled "Air+HC" in FIG. 2) flowing out of the canister 11 into the purge passage 12 passes through the pump part 19 and flows toward the purge valve 14. Since the purge gas passes through the pump part 19 as above, the purge concentration estimating part 17a can estimate the purge concentration based on a differential pressure between the front and the rear of the pump part 19 detected by the pressure detecting unit 16. Especially, the purge pump 13 is positioned close to the canister 11 apart from the purge valve 14, so that the purge primp 13 is less subjected to the influence of pulsation caused by the purge valve 14. Accordingly, the accuracy of estimating the purge concentration can be enhanced.

The heating part 22 of the purge pump 13 is arranged such that at least a part of the heating part 22 is exposed in the inside of the atmosphere passage 15. In the example shown in FIG. 2, concretely, a part of the motor part 20 and the whole of the circuit part 21 are placed inside the atmosphere passage 15.

Accordingly, the air flowing through the atmosphere passage 15 can be heated by contact with an outer wall 22a (one example of a housing) of the heating part 22. Specifically, heat exchange is conducted between the air flowing through the atmosphere passage 15 and the heat generated in the heating part 22, so that the air flowing through the atmosphere passage 15 cools the heating part 22 and the heat dissipated from the heating part 22 heats the air which flows from the atmosphere passage 15 into the canister 11. Consequently, the inside of the canister 11 is heated, promoting desorption of vaporized fuel in the canister 11. Moreover, since the heating part 22 is cooled, a heat load on the purge pump 13 can be reduced, leading to enhanced reliability of the purge pump 13, for example, enhanced life of components such as a bearing.

In FIG. 2 and FIGS. 3 to 7 and 12 which will be described later, heated zones (e.g., the heating part 22 and the heated air) are hatched with dots for convenience of explanation.

Examples 2 to 8 will be described below with a focus on differences from Example 1.

EXAMPLE 2

Figure 3:
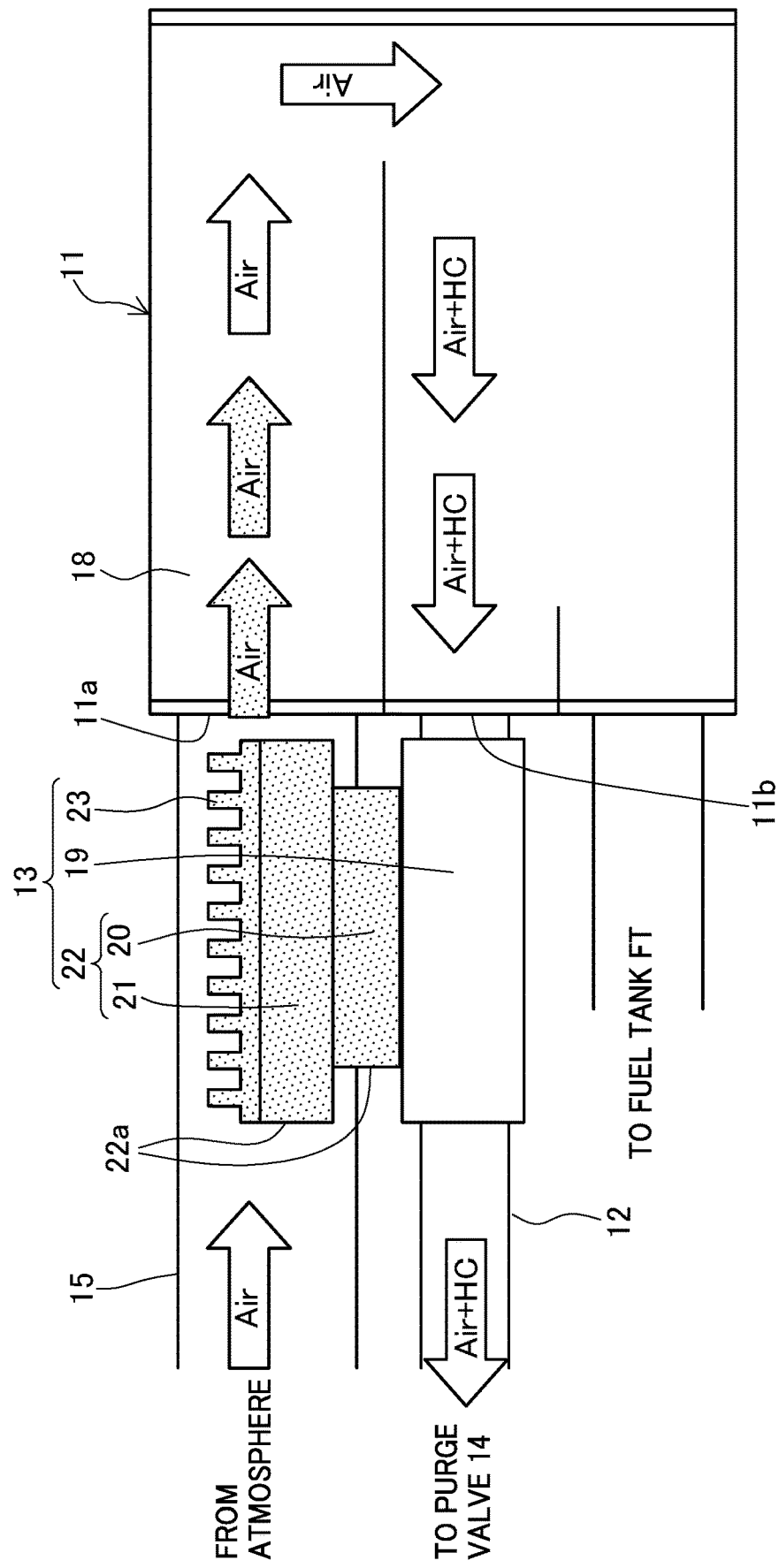
FIG. 3 is a diagram showing Example 2 of the purge pump.

In Example 2, as shown in FIG. 3, a heatsink 23 (one example of a heat-dissipating member) is provided in at least a part of the outer wall 22a of the heating part 22 of the purge pump 13. In the example show in FIG. 3, the heatsink 23 is mounted on the outer wall of the circuit part 21 located inside the atmosphere passage 15.

Thus, the air flowing through the atmosphere passage 15 is heated by contact with the outer wall 22a of the heating part 22 and the heatsink 23. At that time, the dissipation of heat from the heating part 22 is promoted by the heatsink 23, thereby accelerating heat exchange between the air flowing through the atmosphere passage 15 and the heat generated in the heating part 22. Consequently, cooling of the heating part 22 and heating the air flowing from the atmosphere passage 15 into the canister 11 can be promoted.

EXAMPLE 3

Figure 4:
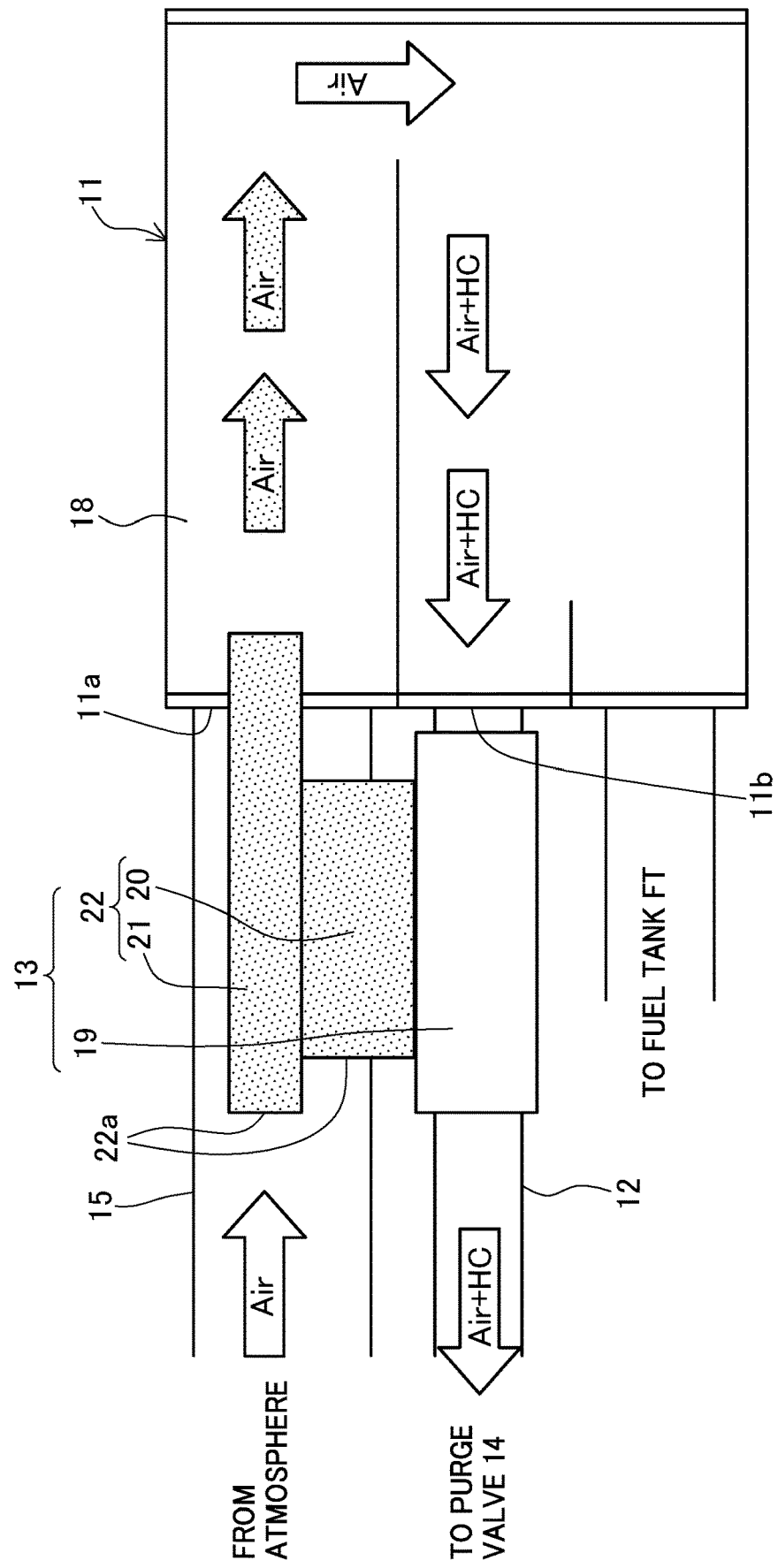
FIG. 4 is a diagram showing Example 3 of the purge pump.

In Example 3, as shown in FIG. 4, a part of the heating part 22 of the purge pump 13 is in contact with the activated carbon 18 in the canister 11, concretely, a portion of the activated carbon 18 located close to the atmosphere passage 15. In the example shown in FIG. 4, a part of the outer wall 22a of the circuit part 21 is in contact with the activated carbon 18.

In this example, the activated carbon 18 is directly heated by the heating part 22. Thus, the desorption of vaporized fuel in the canister 11 can be further promoted.

EXAMPLE 4

Figure 5:
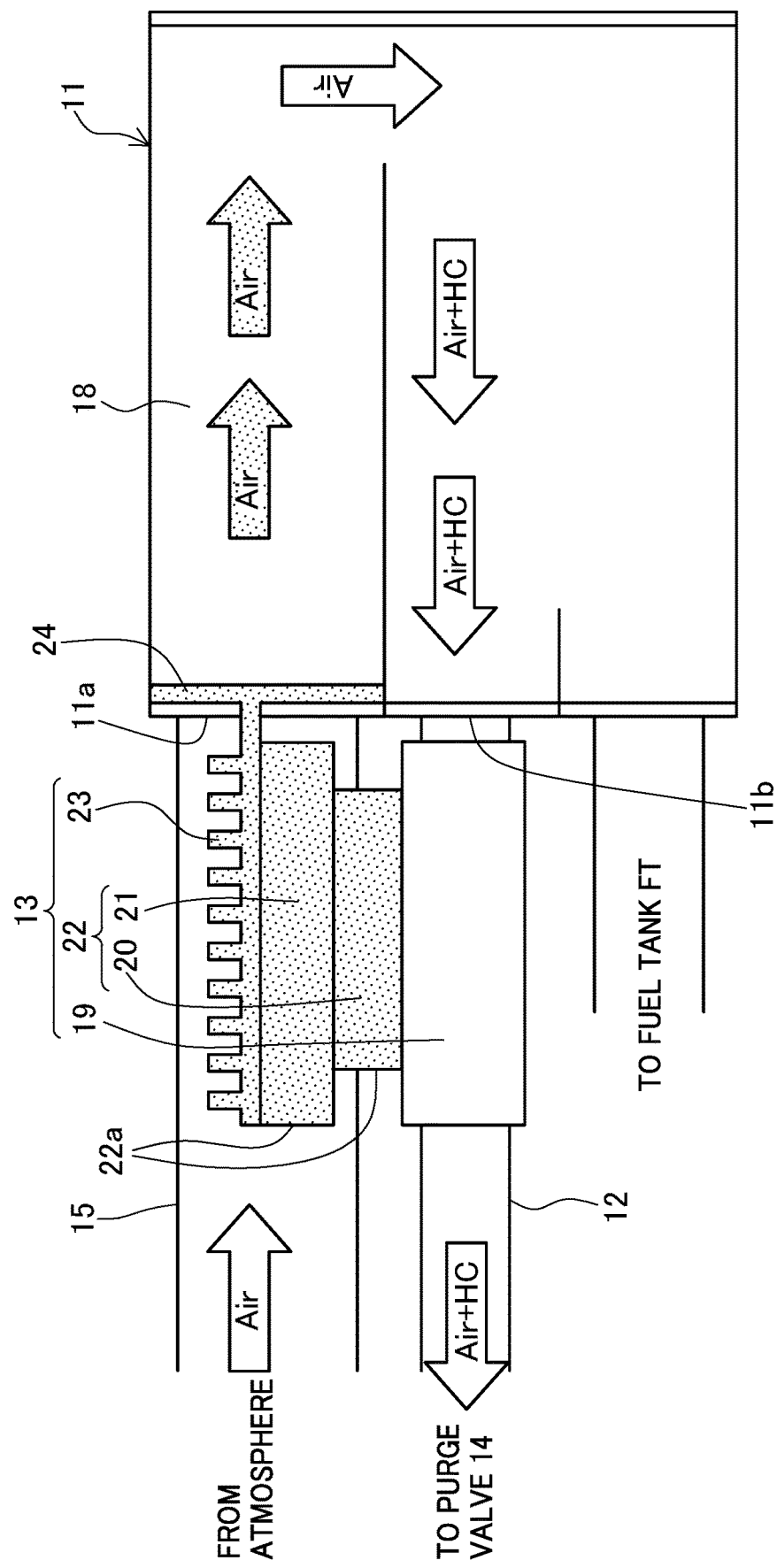
FIG. 5 is a diagram showing Example 4 of the purge pump.

In Example 4, a shown in FIG. 5, the outer wall 22a of the heating part 22, i.e., the heatsink 23, contacts with the activated carbon 18 in the canister 11 through a heat transfer member 24. This heat transfer member 24 is configured to have air permeability so as neither to inhibit the adsorption performance of the activated carbon 18 or to disturb a flow of the air into the canister 11. For example, the heat transfer member 24 may be a heatsink having a number of pores.

In this example, the activated carbon 18 is heated by the heating part 22 through the heat transfer member 24. Thus, the desorption of vaporized fuel in the canister 11 can be further promoted.

EXAMPLE 5

Figure 6:
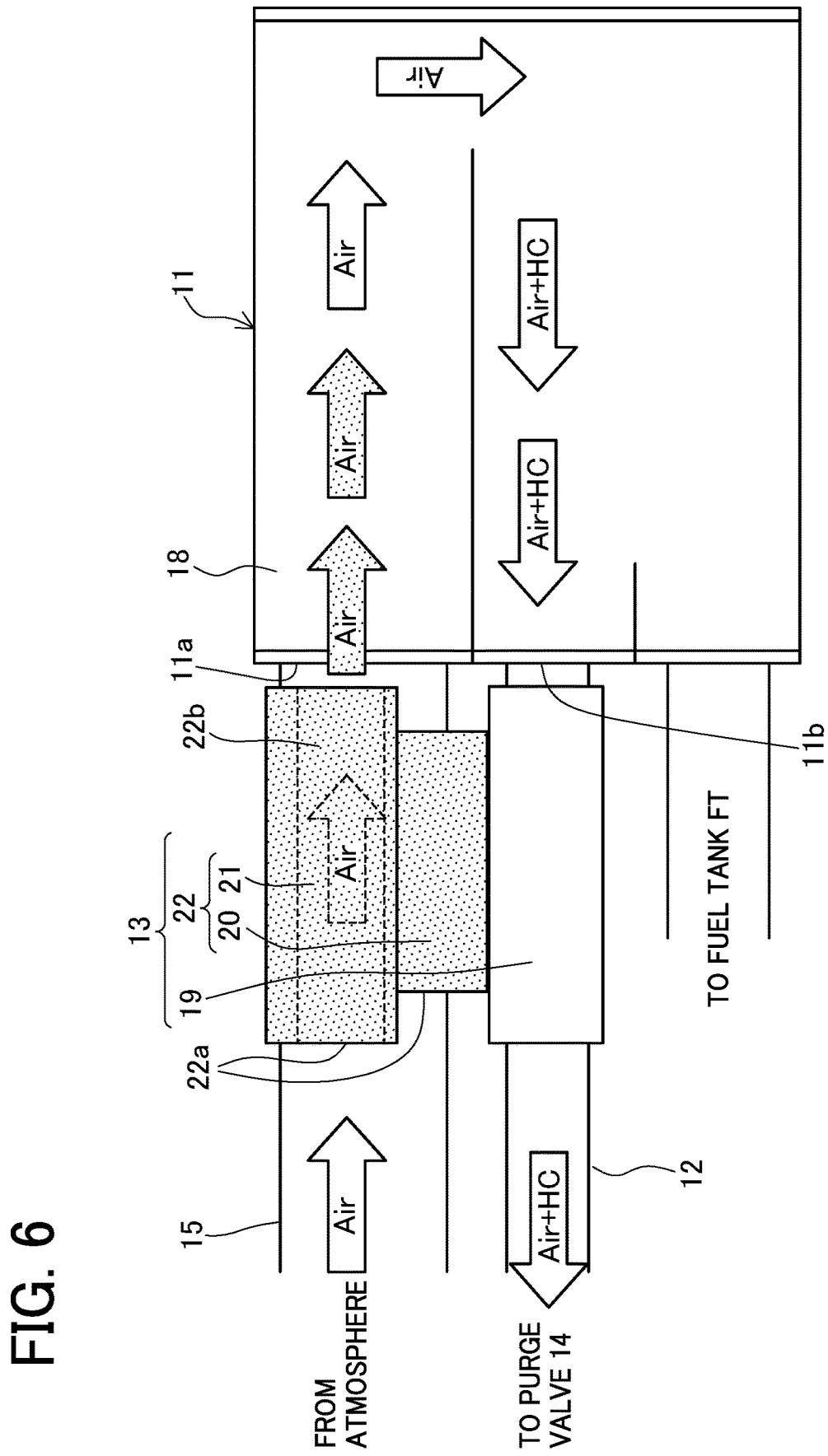
FIG. 6 is a diagram showing Example 5 of the purge pump.

In Example 5, as shown in FIG. 6, air flows through the inside of the heating part 22 of the purge pump 13. Specifically, the heating part 22 internally includes a flow path 22b for passage of air. This flow path 22b is configured to allow the air flowing through the atmosphere passage 15 to pass, or flow, through the flow path 22b. In the example shown in FIG. 6, the flow path 22b is provided in the circuit part 21.

In this example, the heating part 22 configured as above can enhance the efficiency of exchanging the air flowing through the atmosphere passage 15 and the heat generated in the heating part 22. Furthermore, a stream of the air is less disturbed or interrupted by the heating part 22 and hence a flow path resistance in the atmosphere passage 15 is prevented from increasing.

EXAMPLE 6

Figure 7:
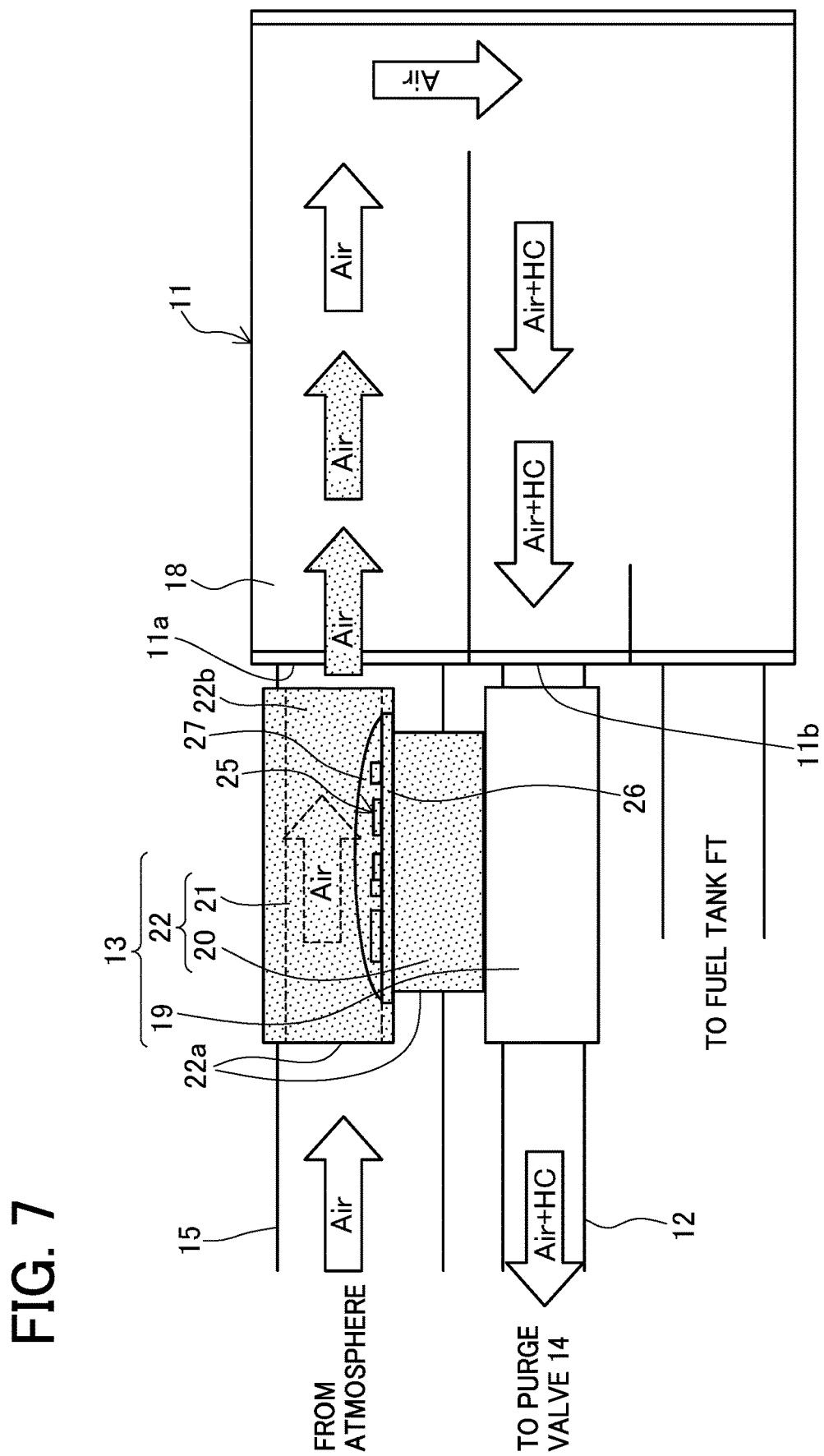
FIG. 7 is a diagram showing Example 6 of the purge pump.

In Example 6 in which air flows through the inside of the heating part 22 of the purge pump 13 the circuit 25 in the circuit part 21 is protected. To be concrete, as shown in FIG. 7, the circuit 25 mounted on a circuit substrate 26 is covered or coated with a protective member 27 provided in the circuit part 21.

In this example, the circuit 25 can be prevented from rusting due to direct contact with air (especially, air containing water). The circuit 25 is thus protected from rust.

EXAMPLE 7

In the case where the heating part 22 is provided with the flow path 22b as exemplified in the foregoing examples, vaporized fuel flows from the fuel tank FT into the canister 11 when the fuel tank FT is depressurized during refueling. Thus, the vaporized fuel (the purge gas) may flow from the canister 11 into the flow path 22b of the heating part 22 through the atmosphere passage 15. In such a case, the inside of the heating part 22 may be influenced by the vaporized fuel causing ignition or advancing deterioration.

Figure 8:
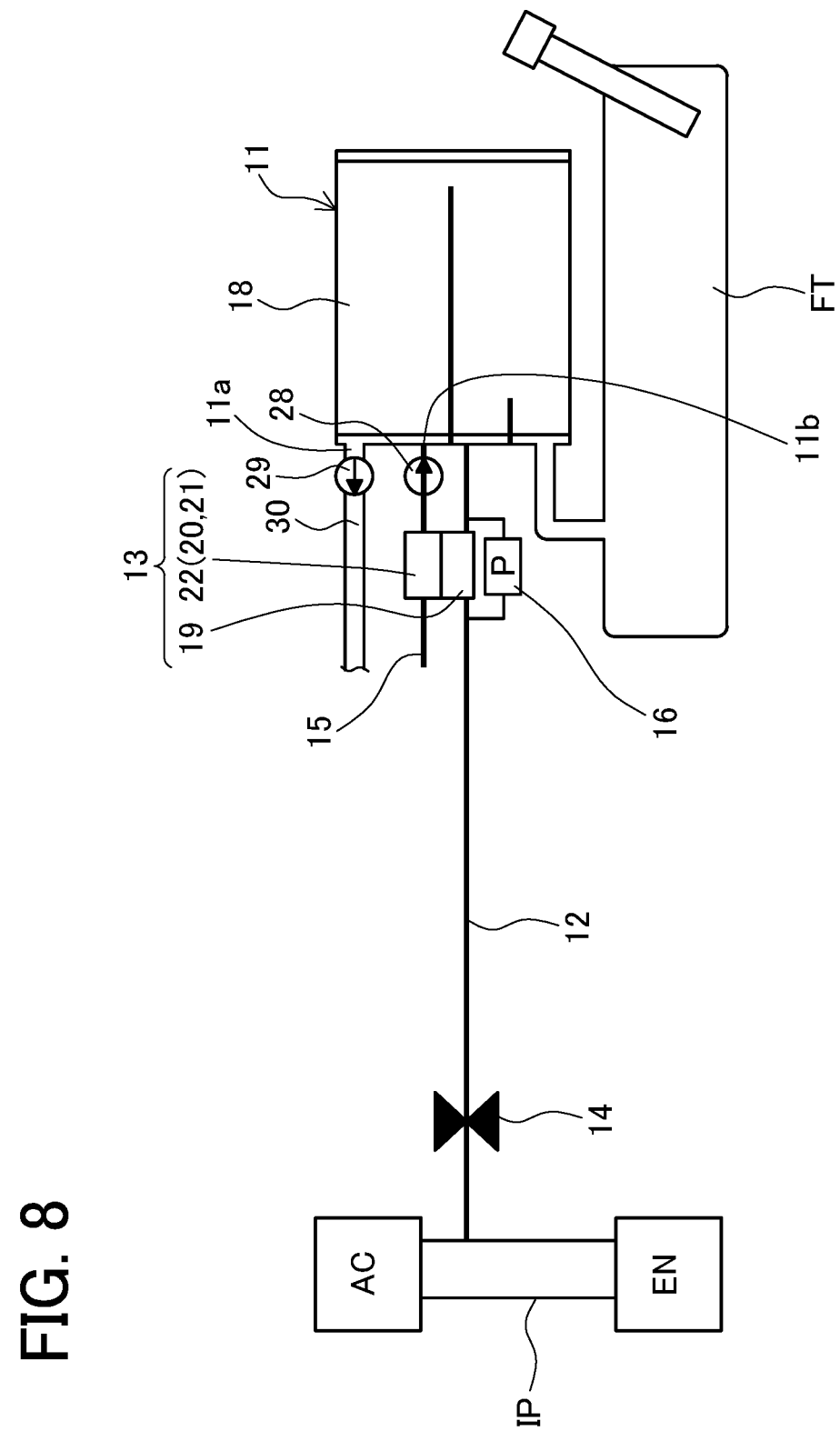
FIG. 8 is a diagram showing Example 7 of the purge pump.

In Example 7, therefore, as shown in FIG. 8, the vaporized-fuel treating apparatus 1 is configured to include an additional passage 30 (one example of another passage) connected to the canister 11. Further, at some place in the atmosphere passage 15 between the canister 11 and the heating part 22, a one-way valve 28 (a first one-way valve) is provided in the atmosphere passage 15 between the canister 11 and the heating part 22. This one-way valve 28 is configured to allow a fluid (air) to flow in only one direction from the heating part 22 to the canister 11. In addition, another one-way valve 29 (a second one-way valve) is provided in the passage 30. This one-way valve 29 is configured to allow a fluid (vaporized fuel) to flow in only one direction from the canister 11.

Figure 9:
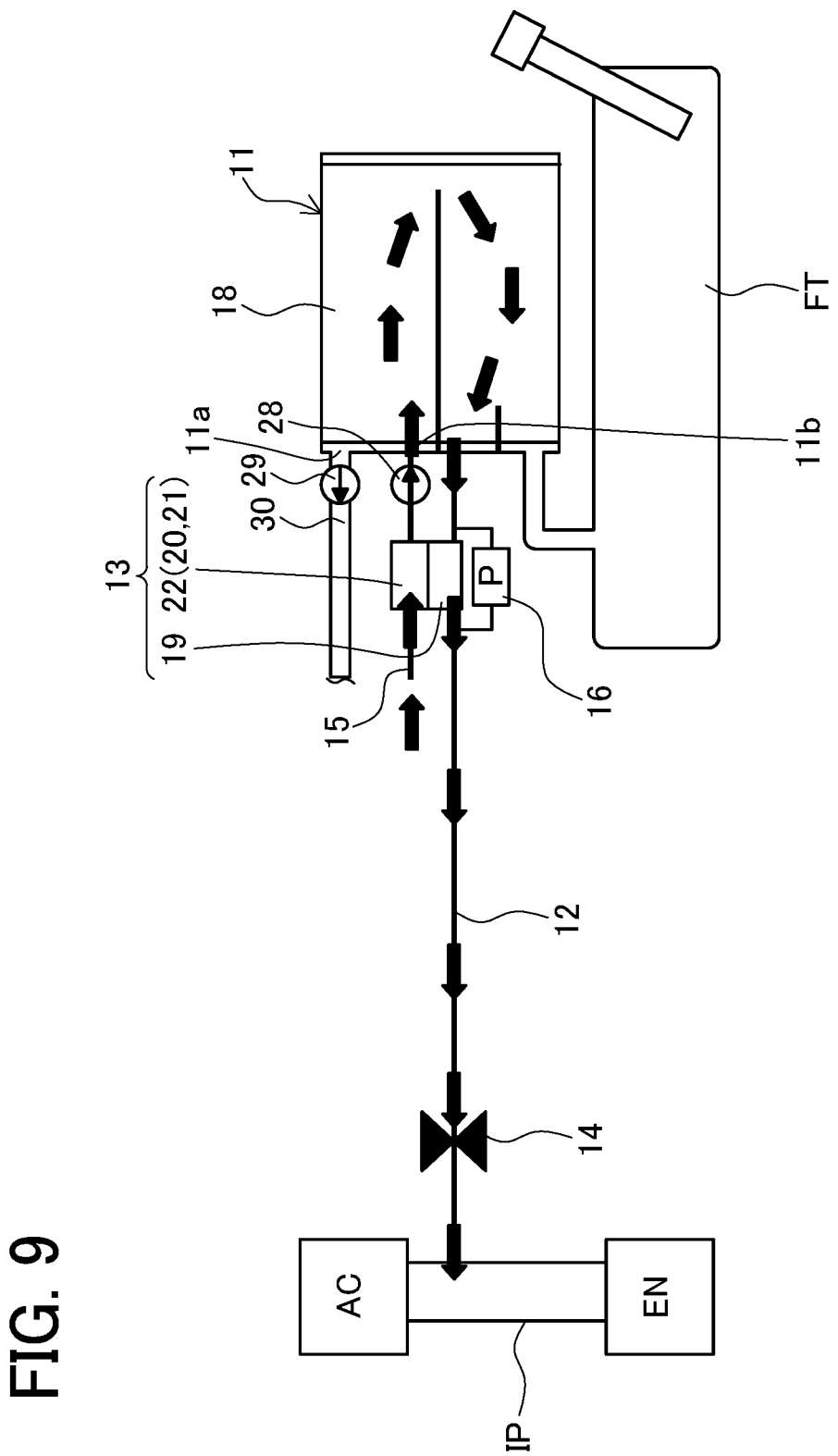
FIG. 9 is a diagram showing operations during execution of purge control in Example 7.
Figure 10:
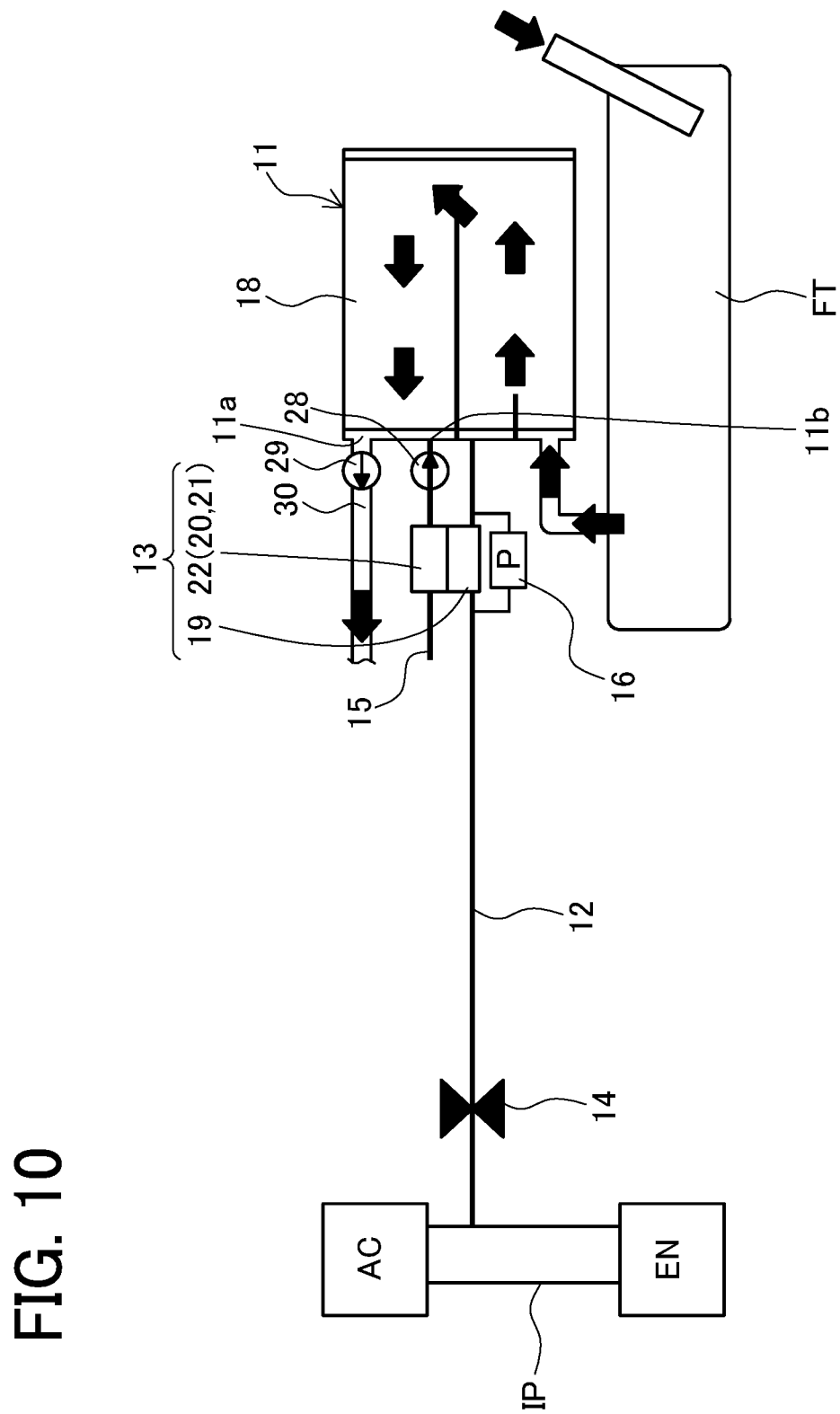
FIG. 10 is a diagram showing operations during depressurizing of a fuel tank in Example 7.

In this example, when the purge control is performed above during vehicle running or the like, as shown in FIG. 9, the air flowing through the atmosphere passage 15 passes through the inside of the heating part 22 (the flow path 22b) and then flows into the canister 11 through the one-way valve 28. When the fuel tank FT is depressurized for refueling or other reasons, as shown in FIG. 10, the purge gas is allowed to flow out of the canister 11 to the passage 30 through the one-way valve 29, but blocked by the one-way valve 28 from flowing in the inside (the flow path 22b) of the heating part 22 through the atmosphere passage 15. The one-way valve 28 and the one-way valve 29 are one example of a passage adjusting part configured to allow purge gas to flow 1 om the canister 11 to the passage 30, but to disallow purge gas to flow from the canister 11 to the atmosphere passage 15.

As an alternative, the passage 30 may be formed as a passage branching off from the atmosphere passage 15 at a position close to the canister 11 relative to the heating part 22 in the atmosphere passage 15. As one example of the passage adjusting part, instead of the one-way valves 28 and 29, a passage switching valve may be used to switch between the atmosphere passage 15 and the passage 30 as the passage to be communicated with the canister 11.

EXAMPLE 8

Figure 11:
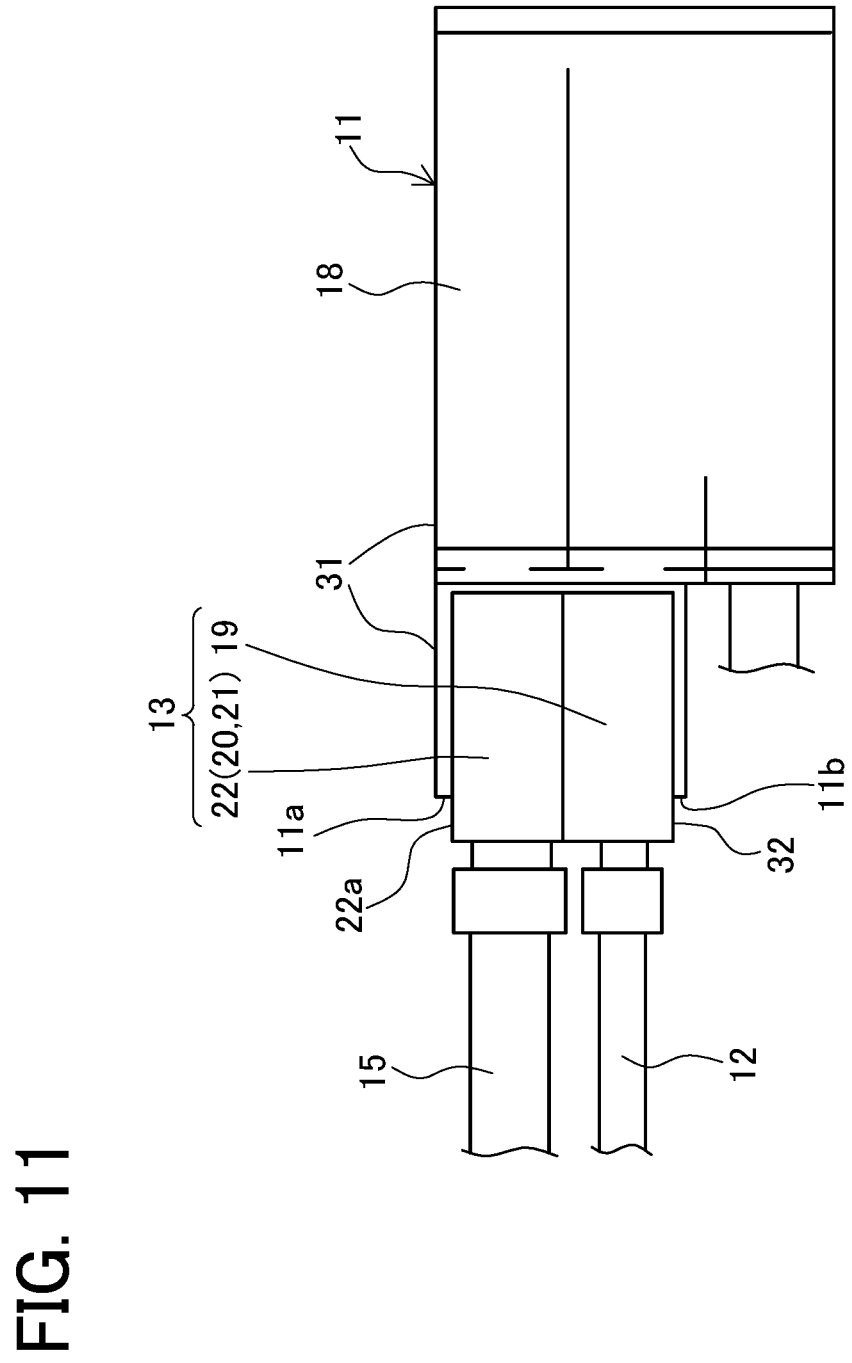
FIG. 11 is a diagram showing Example 8 of the purge pump.

In Example 8, as shown in FIG. 11, the purge pump 13 (the pump part 19 and the heating part 22) and the canister 11 are provided as an integral unit. To be concrete, the canister 11 includes a case 31, in which the purge pump 13 is placed. This configuration facilitates installation of the purge pump 13. In addition, the canister 11 can suppress vibration of the purge pump 13 during driving. The case 31 of the canister 11 and a housing (also referred to as a case) 32 of the purge pump 13 are made of the same material entirely by integral molding.

In the example shown in FIG. 11, the pump part 19 is placed connecting to the purge passage 12; however, it is not limited to such a configuration. For example, the purge passage 12 may include an extended portion extending deeply into the case 31 so that the pump part 19 is placed in the extended portion inside the case 31.

A part of the case 31 of the canister 11 is constituted of the outer wall 22a of the heating part 22. This configuration can reduce the number of coupling parts needed to install the purge pump 13, resulting in reduction in cost.

Figure 12:
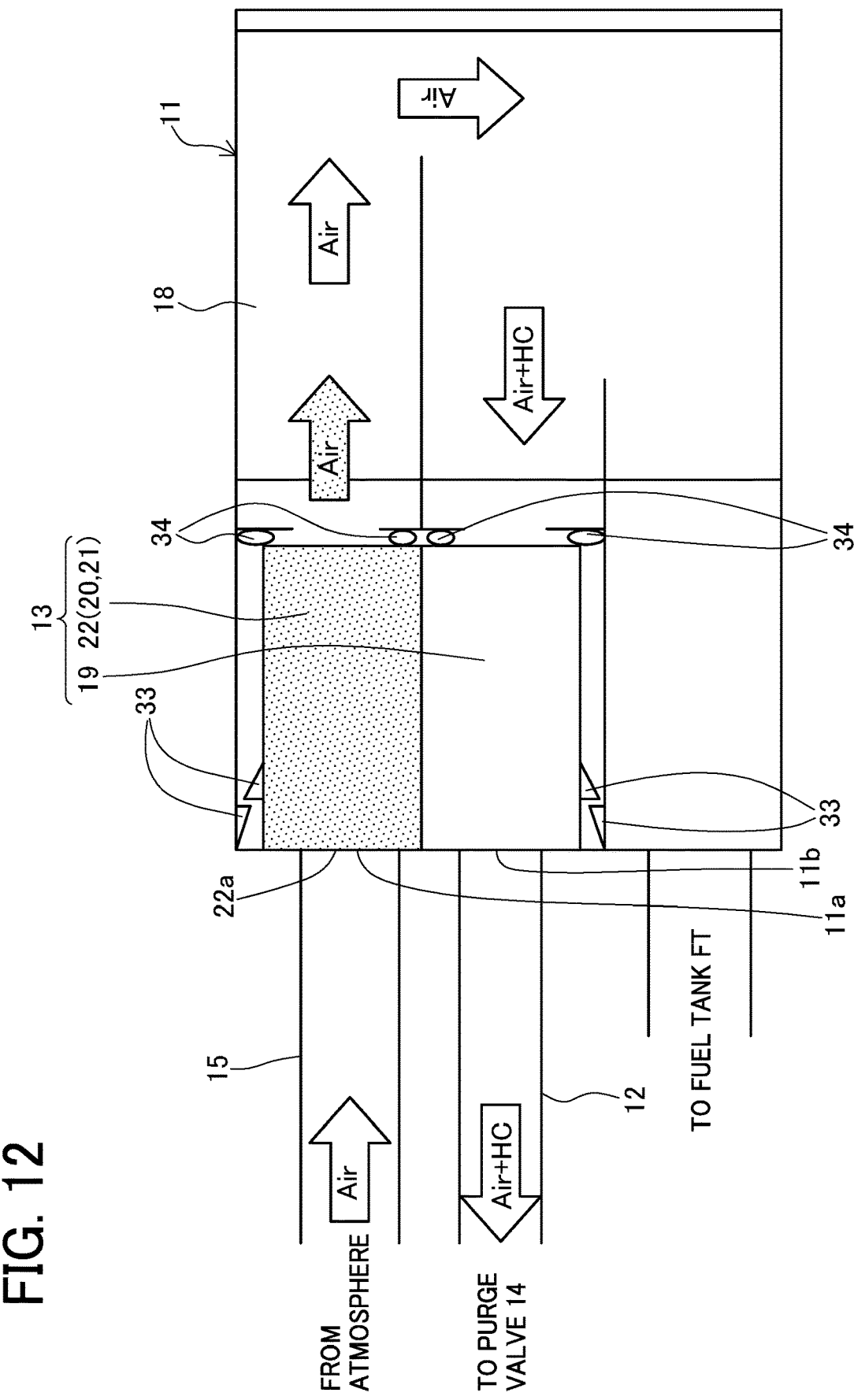
FIG. 12 is a diagram showing a modified example of Example 8.

As a modified example, as shown in FIG. 12, the purge pump 13 may be integrally fitted in a part of the canister 11. To be concrete, the purge pump 13 is fitted in the area of the canister 11 with fitting members 33, such as snap-fit members. In the canister 11, at positions corresponding to the purge pump 13, seal members 34 (e.g., O-rings) are provided.

Since the purge pump 13 is integrated with the canister 11 as above, the necessity of components for installing the purge pump 13 in the purge passage 12 or the atmosphere passage 15, such as pipes with brackets or with both-end quick connectors, can be eliminated and thus cost reduction can be achieved.

Furthermore, the above configuration enables the heating part 22 to be placed in a position in the activated carbon 18 which should be most heated, on the side close to the atmosphere passage 15. This reduces dissipation of heat from the heating part 22 to the atmosphere passage 15. Thus, the heat transfer efficiency to the canister 11 can be enhanced, promoting desorption of vaporized fuel in the canister 11.

Moreover, the purge pump 13 has only to be fitted in the aforementioned area in the canister 11 by means of the fitting member 33. This configuration facilitates replacement of the purge pump 13, and thereby enhance the service performance at the time of replacement of broken parts and enables flexible addressing (changing the specifications) to meet a demand for a different combination of specifications.

Rapid Heating Control of Heating Part

Meanwhile, for execution of the purge control, when the heating part 22 is caused to rapidly generate heat to quickly heat the airy that flows from the atmosphere passage 15 into the canister 11, thereby immediately heating the inside of the canister 11, desorption of the vaporized fuel in the canister 11 is promoted. This makes it possible to complete the desorption of vaporized fuel in the canister 11 in a short time.

Therefore, in the case where the purge pump 13 is placed as shown in Examples 1 to 8 mentioned above to cause the heating part 22 to heat the air flowing through the atmosphere passage 15, the vaporized-fuel treating apparatus 1 in the present embodiment may include a rapid heating control part 17b for rapidly heating the heating part 22. This action, "rapidly heating", indicates for example the heating with thermal energy higher than usual thermal energy used during driving an engine EN.

Figure 13:
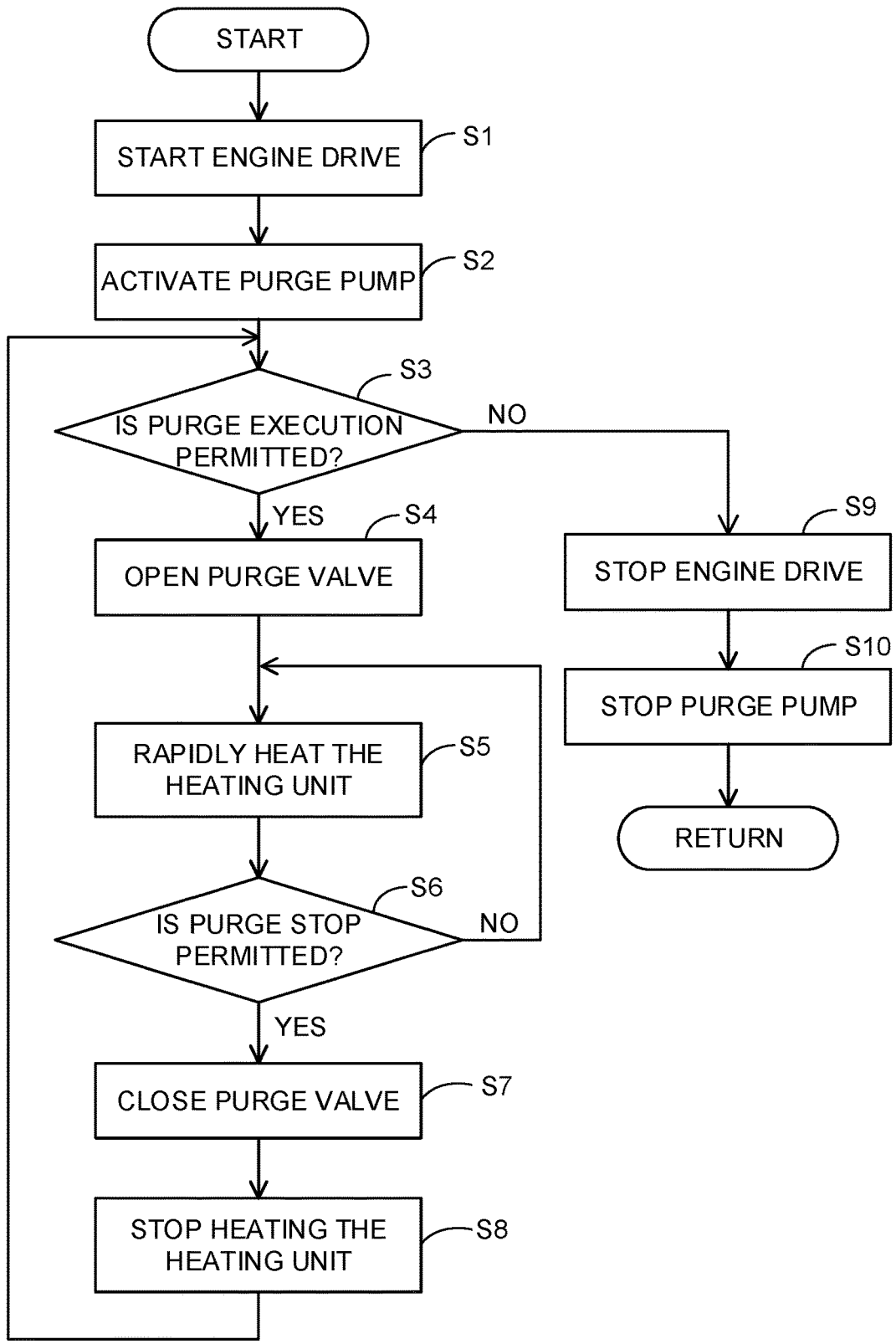
FIG. 13 is a flowchart of the control to be carried out by the controller in a vaporized-fuel treating apparatus including a rapid heating control part.

In the configuration that the vaporized-fuel treating apparatus 1 includes the rapid heating control part 17b as above, the controller 17 is configured to perform the control based on a flowchart shown in FIG. 13, for example. Specifically, as shown in FIG. 13, the controller 17 starts to drive the engine EN (step S1), activates the purge pump 13 (step S2), and then determines whether or not the condition(s) for purge control is satisfied and execution of the purge control is permitted (step S3). If the purge control condition(s) is satisfied and thus the execution of the purge control is permitted (S3: YES), the controller 17 causes the purge valve 14 to open (i.e., come into an open state) (step S4), and performs the purge control.

In the present embodiment, when the purge control is actually performed after the condition(s) for purge control is satisfied, the controller 17 executes a rapid heating control to cause the rapid heating control part 17b to rapidly heat the heating part 22 (step S5). Accordingly, the air flowing from the atmosphere passage 15 into the canister 11 is rapidly heated, thereby quickly heating the inside of the canister 11 (i.e., the activated carbon 18). This heated canister 11 promotes the vaporized fuel to rapidly desorb from the activated carbon 18 in the canister 11. Consequently, the desorption of the vaporized fuel in the canister 11 can be completed in a short time.

When stop of the purge control is permitted (S6: YES), thereafter, the controller 17 causes to the purge valve 14 to close (i.e., come into a closed state) (step S7), stops causing the rapid heating control part 17b to rapidly heat the heating part 22 (step S8), and then returns the processing to step S3. In contrast, if the execution of the purge control is not permitted in step S3 (S3: NO), the controller 17 stops driving the engine EN (step S9) and then stops the purge pump 13 (step S10).

The following description is given to a concrete method for rapidly heating the heating part 22 by use of the rapid heating control part 17b in step S5.

As a first method, the rapid heating control part 17b may be configured to control energization of the motor part 20 of the heating part 22 to rapidly heat the heating part 22.

Figure 14:
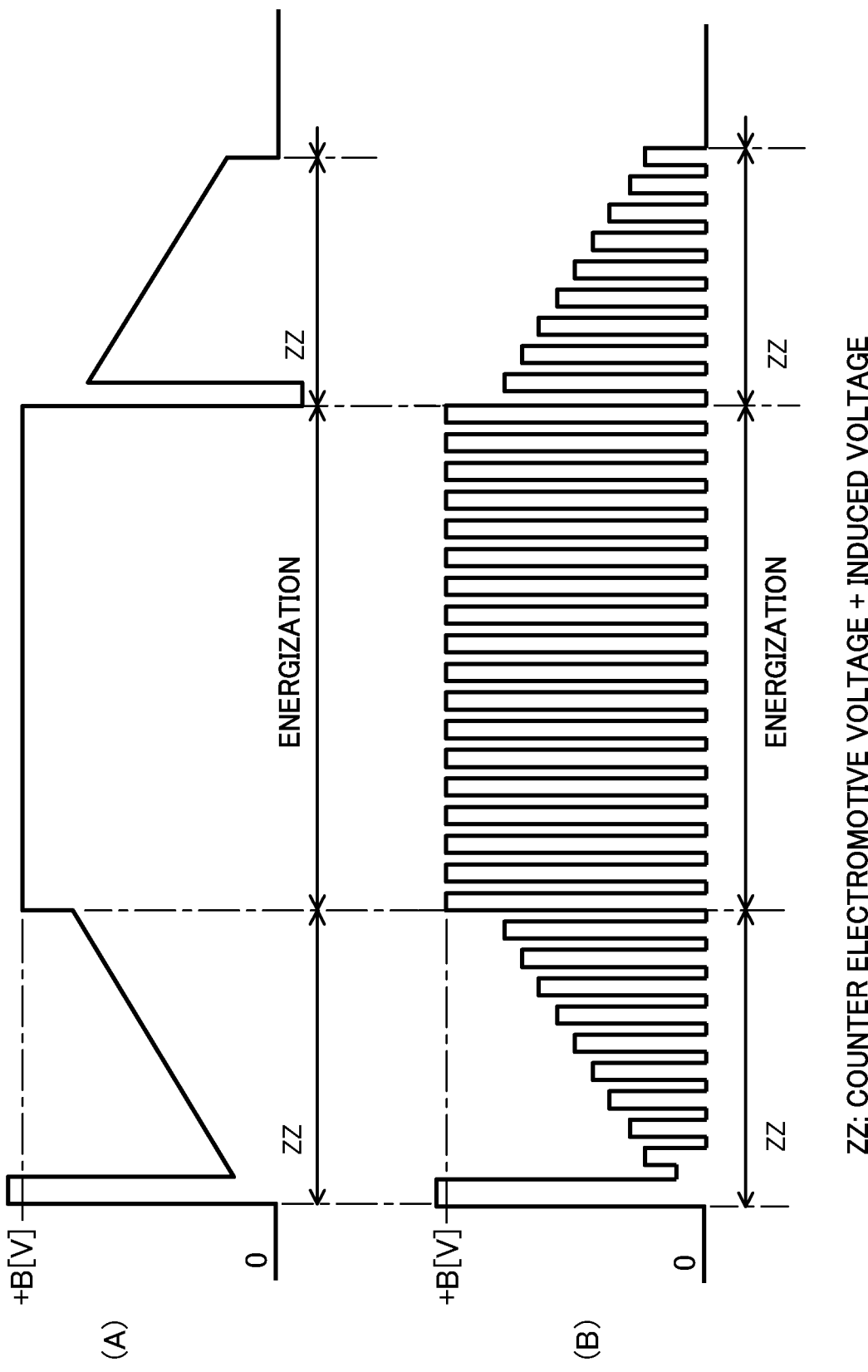
FIG. 14 is a chart showing one example of a method for rapidly heating a heating part.
Figure 15:
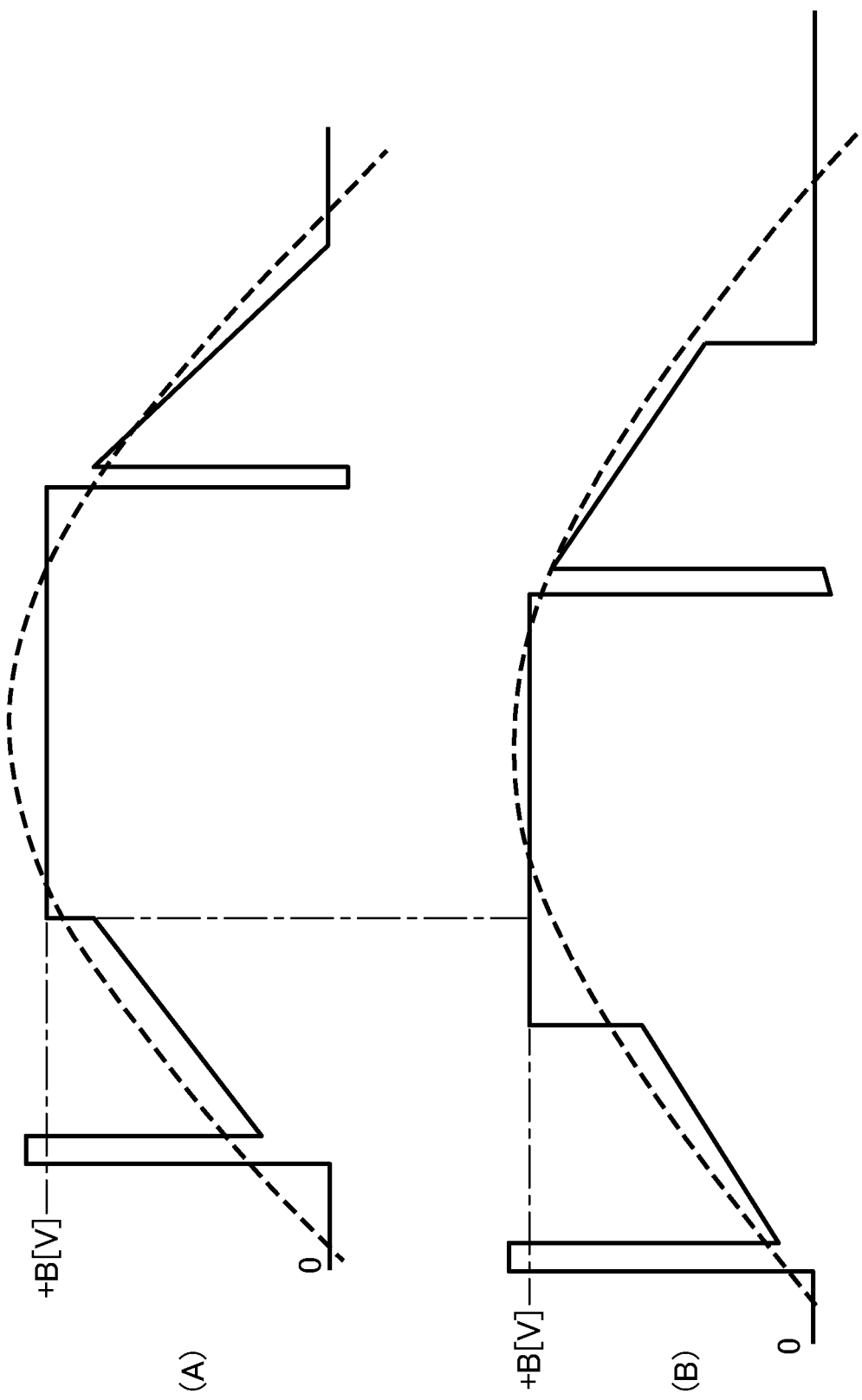
FIG. 15 is a chart showing another example of a method for rapidly heating a heating part.

For the above purpose, for example, the rapid heating control part 17b is configured to increase or decrease the voltage to rapidly heat the heating part 22 by repeatedly turning ON and OFF a drive circuit (i.e., the circuit part 21) for driving the heating part 22 with a Duty signal as shown in FIG. 14 (B). This voltage waveform is different from that output during normal engine running as shown in FIG. 14 (A). As another example, the rapid heating control part 17b is configured to increase an electric current to rapidly heat the heating part 22 by changing an electric lead angle for energization to the motor part 20 as shown in FIG. 15 (B). This voltage waveform is different from that output during normal engine running as shown in FIG. 15(A). In each of FIGS. 14 and 15 in which voltage waveforms are plotted, the vertical axis indicates voltage and the lateral axis indicates time. When the motor of the motor part 20 is rotated by inertia, furthermore, the rapid heating control part 17b repeatedly energizes the motor part 20 alternately in a direction to instantaneously stop the motor and a direction to rotate the motor, thereby rapidly heating the heating part 22.

Figure 16:
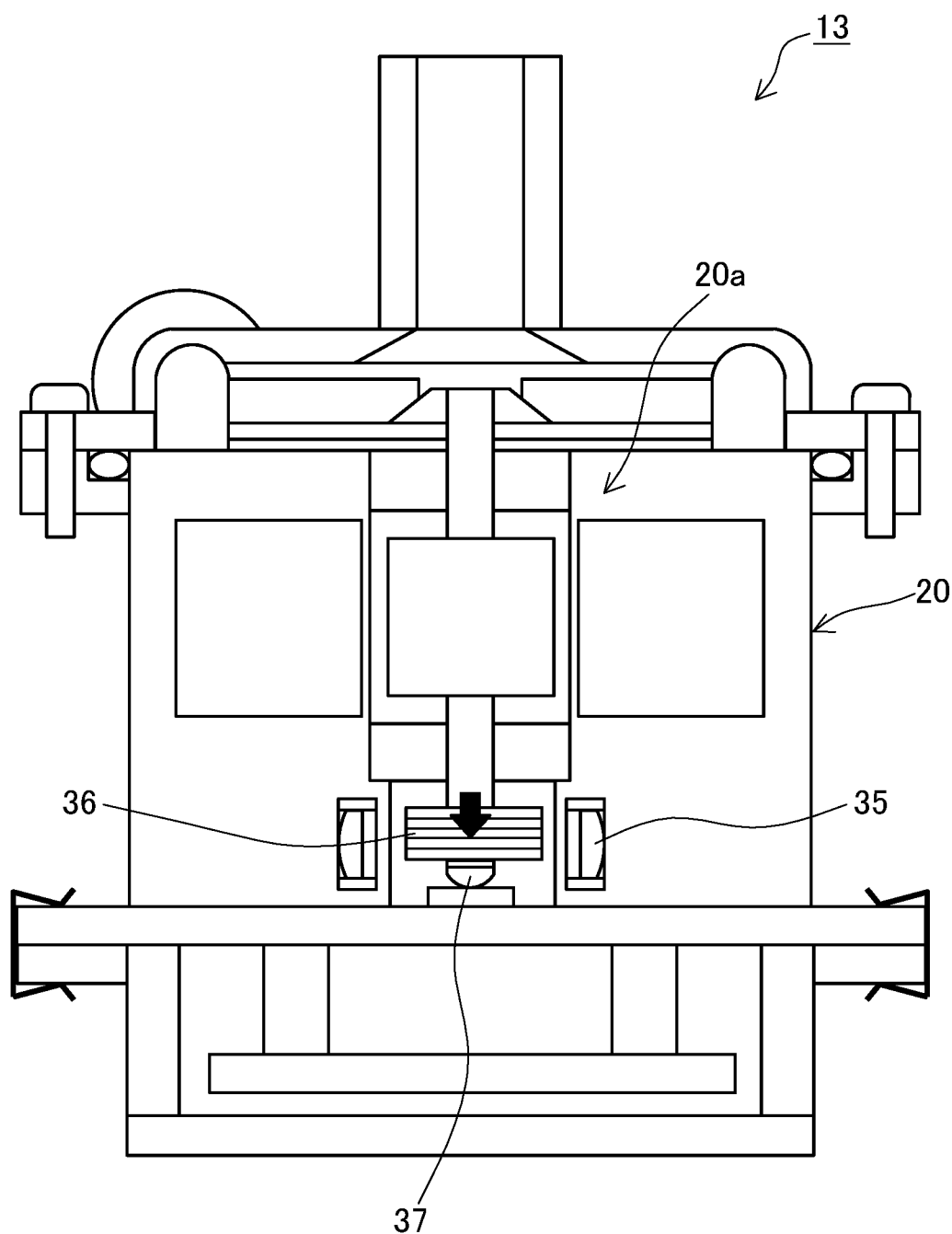
FIG. 16 is a diagram showing another example of a method for rapidly heating a heating part.

As a second method, the motor part 20 may be configured such that a slide member(s) provided therein generates a higher frictional force (friction resistance) during sliding, and the rapid heating control part 17b may be configured to increase a request torque to increase an electric current to be applied to the motor to rapidly heat the heating part 22. For instance, in one example of the purge valve 13 as shown in FIG. 16, a solenoid coil 35 is energized. Thus, a core 36 is moved downward, causing an increase in contact surface pressure between a thrust pin 37 (i.e., a motor shaft) and a corresponding component. This contact generates a friction resistance on a slide member attached to the thrust pin 37, so that an electric current value of the motor 20a rises to perform rapid heating.

Figure 17:
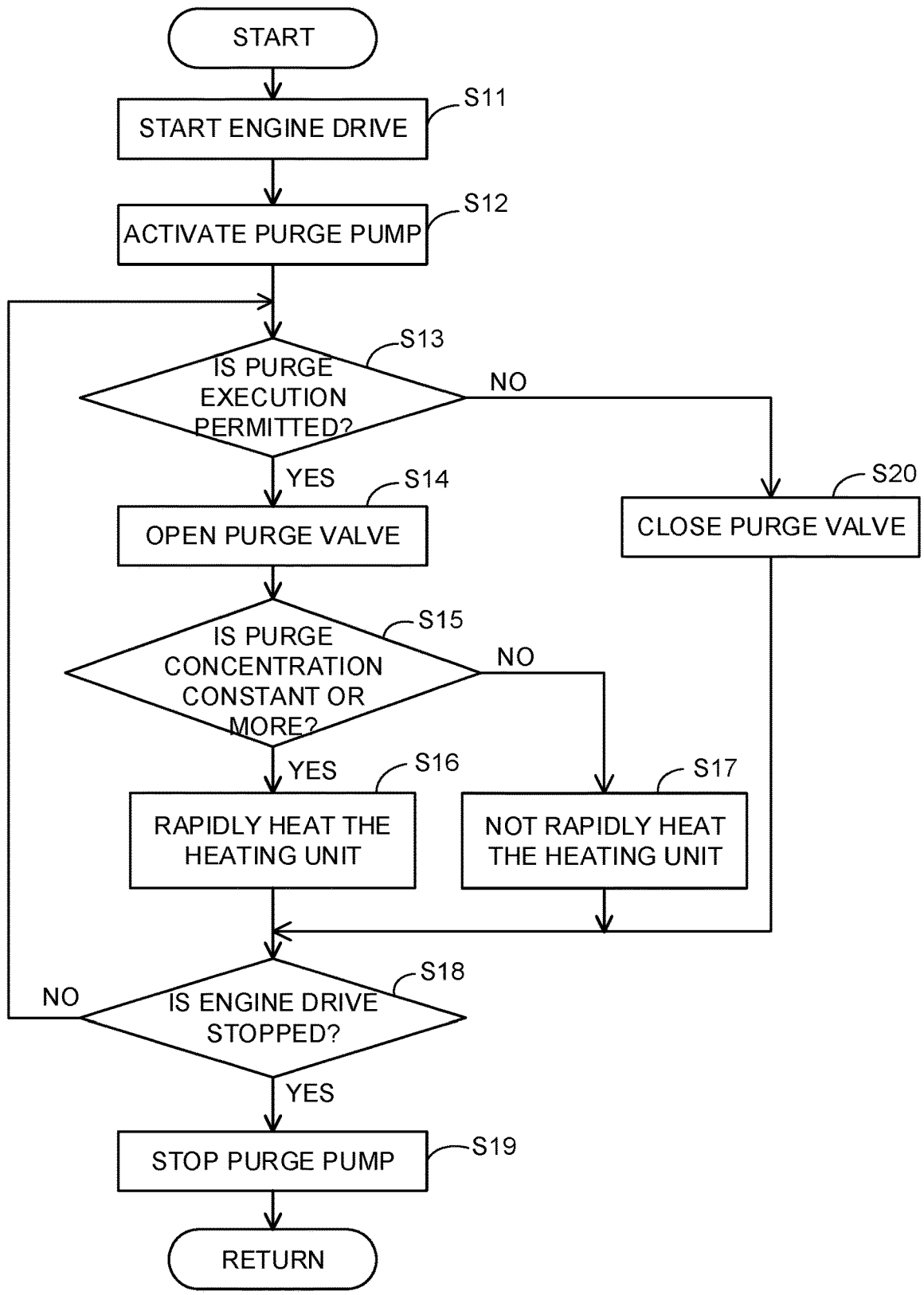
FIG. 17 is a flowchart of the control to be performed by a controller in a vaporized-fuel treating apparatus including a rapid heating control part in a modified example.

As a modified example, the controller 17 also may be configured to perform the control based on a flowchart shown in FIG. 17. A different feature in this flowchart from FIG. 13 as follows. When the purge concentration is equal to or larger than a predetermined value which is constant (S15: YES), the controller 17 causes the rapid heating control part 17b to rapidly heat the heating part 22 (step S16). In contrast, when the purge concentration is smaller than the predetermined value (S15: NO), the controller 17 does not cause the rapid heating control part 17b to rapidly heat the heating part 22 (step S17). In this modified example, as mentioned above, the controller 17 performs the rapid heating control using the rapid heating control part 17b under the condition that the purge concentration in the purge passage 12 is the predetermined value or higher. For high purge concentration, accordingly, the heating pat 22 is immediately heated, thus promoting desorption of vaporized fuel in the canister 11. Further, the frequency of execution of the rapid heating control can be reduced.

Subsequently, when the engine EN is stopped (S18: YES), the controller 17 stops the purge pump 13 (step S19). When the execution of purge control is not permitted (S13: NO), the controller 17 closes the purge valve 14 (step S20). cl Operations and Effects in the Present Embodiment In the vaporized-fuel treating apparatus 1 in the present embodiment described above, the purge pump 13 is installed such that at least a part of the heating part 22 is exposed in the atmosphere passage 15 and the pump part 19 is either (i) placed in the purge passage 12 or (ii) placed connecting to the purge passage 12.

The above configuration can perform both cooling of the heating part 22 and promoting of desorption of vaporized fuel in the canister 11 by heating the air flowing in the canister 11. Since the purge gas flows through the pump part 19, the purge concentration can be estimated based on a differential pressure between the front and the rear of the pump part 19.

Since the purge pump 13 (the pump part 19 and the heating part 22) is provided integral with the canister 11, moreover, the purge pump 13 can be easily installed. Further, the canister 11 can suppress vibration of the purge pump 13 during operation.

The purge pump 13 (the pump part 19 and the heating part 22) may be provided inside the case 31 of the canister 11. This configuration can reduce the number of coupling parts needed for installation of the purge pump 13, resulting in cost reduction.

Furthermore, a part of the case 31 of the canister 11 may be constituted of the outer wall 22a of the heating part 22. This configuration can enhance the efficiency of heat exchange between the air flowing through the atmosphere passage 15 and the heat generated in the heating part 22. The number of components can also be reduced.

In at least a part of the outer wall 22a of the heating part 22, the heatsink 23 may be provided. This heatsink 23 can promote dissipation of heat from the heating part 22, thereby accelerating cooling of the heating part 22 and heating of the air flowing from the atmosphere passage 15 into the canister 11.

The heating part 22 may be internally provided with the flow path 22b to allow the air flowing through the atmosphere passage 15 to pass. This configuration can enhance the efficiency of heat exchange between the air flowing through the atmosphere passage 15 and the heat generated in the heating part 22. In addition, this configuration can prevent a flow of air from being inhibited by the heating part 22 and hence avoid increasing of the flow path resistance in the atmosphere passage 15.

The circuit 25 in the heating part 22 may be covered by the protective member 27. Accordingly, the circuit 25 is not exposed directly to air and can be protected from rusting.

The vaporized-fuel treating apparatus 1 may include the one-way valve 28 and the one-way valve 29 each serving as a passage adjusting part to enable a flow of purge gas from the canister 11 to the passage 30, but to disable a flow of purge gas from the canister 11 to the atmosphere passage 15.

This configuration can block purge gas from flowing from the canister 11 to the heating part 22 during depressurizing of the fuel tank FT, such as during refueling, and therefore can prevent the influence, e.g., igniting or deteriorating, of vaporized fuel contained in purge gas on the heating part 22.

The vaporized-fuel treating apparatus 1 may include the rapid heating control part 17b configured to rapidly heat the heating part 22 when the purge control condition(s) is satisfied. Accordingly, the air flowing from the atmosphere passage 15 into the canister 11 is rapidly heated, thereby quickly heating the inside of the canister 11 to promote desorption of the vaporized fuel in the canister 11. Thus, the desorption of the vaporized fuel in the canister 11 can be completed in a short time. In a vehicle, such as an idling stop vehicle or a hybrid vehicle, each driving time of an engine EN is short and therefore the purge control has to be performed in a short period of time. However, the vaporized-fuel treating apparatus 1 configured as above can rapidly desorb the vaporized fuel that adsorbs to the activated carbon 18 in the canister 11.

Accordingly, the rapid heating control part 17b may configured to execute the rapid heating control under the condition that the purge concentration in the purge passage 12 is the predetermined value or higher.

The rapid heating control is thus performed only when much vaporized fuel is adsorbing to the canister 11. This configurations can quickly desorb the vaporized fuel adsorbing to the canister 11 and reduce the frequency of execution of the rapid heating control.

The canister 11 is configured to cause a fluid flowing in the canister 11 to pass through a U-shaped flow path from the atmosphere port connected to the atmosphere passage 15 and the purge port connected to the purge passage 12. This configuration facilitates installation of the purge pump 13 in a desired place.

The vaporized-fuel treating apparatus 1 includes the purge concentration estimating part 17a configured to estimate the purge concentration based on a differential pressure between the front and the rear of the pump part 19. Thus, the vaporized-fuel treating apparatus 1 can estimate the purge concentration of purge gas flowing through the purge passage 12 while heating the air flowing through the atmosphere passage 15.

The aforementioned embodiments are mere example and give no limitation to the present disclosure. The present disclosure may be embodied in other specific forms without departing from the essential characteristics thereof.

As an alternative, for example, the pump part 19 and the heating part 22 may be provided as separate units, instead of as an integral unit. As another alternative, for example, the purge concentration estimating part 17a may be provided separately from the controller 17.

REFERENCE SIGNS LIST

1 Vaporized-fuel treating apparatus
11 Canister
11a Atmosphere port
11b Purge port
12 Purge passage
13 Purge pump
14 Purge valve
15 Atmosphere passage
16 Pressure detecting unit
17 Controller
17a Purge concentration estimating part
17b Rapid heating control part
18 Activated carbon
19 Pump part
20 Motor part
21 Circuit part
22 Heating part
22a Outer wall
22b Flow path
23 Heatsink
24 Heat transfer member
25 Circuit
27 Protective member
28 One-way valve
29 One-way valve
30 Passage
31 Case
32 Housing
33 Fitting member
EN Engine
IP Intake passage
AC Air cleaner
FT Fuel tank
TV Tank pressurization preventing valve

What is claimed is:

1. A vaporized-fuel treating apparatus comprising:
 a purge passage configured to allow purge gas to flow therethrough;
 an atmosphere passage configured to allow air to flow therethrough;
 a canister communicating with the purge passage and the atmosphere passage; and
 a purge pump including a pump part, a motor part, and a circuit part, wherein
 the pump part is configured to control a flow of a fluid,
 the motor part and the circuit part are configured to control driving of the pump part and generate heat,
 at least a part of at least one of the motor part and the circuit part is exposed in the atmosphere passage, and
 the pump part is either (i) in the purge passage or (ii) connecting to the purge passage.

2. The vaporized-fuel treating apparatus according to claim 1, wherein the purge pump, and the canister are integral with one another.

3. The vaporized-fuel treating apparatus according to claim 2, wherein the canister includes a case and the purge pump is within the case.

4. The vaporized-fuel treating apparatus according to claim 2, wherein
 the motor part and the circuit part include a housing, and
 the canister includes a case that includes the housing.

5. The vaporized-fuel treating apparatus according to claim 1, wherein
 the motor part and the circuit part include a housing, and
 a heat-dissipating member is provided to the housing.

6. The vaporized-fuel treating apparatus according to claim 1, wherein the motor part and the circuit part internally include a flow path for passage of air, the flow path being configured to allow air that flows through the atmosphere passage to pass through.

7. The vaporized-fuel treating apparatus according to claim 6, wherein the circuit part internally includes a circuit covered with a protective member.

8. The vaporized-fuel treating apparatus according to claim 6 further comprising:
 another passage either (i) connected to the canister or (ii) branching from the atmosphere passage at a position closer to the canister relative to the motor part and the circuit part; and
 a valve configured to allow the purge gas to flow from the canister to the another passage, but to disallow the purge gas to flow from the canister to the atmosphere passage.

9. The vaporized-fuel treating apparatus according to claim 1, further comprising: a controller configured to perform purge control to deliver the purge gas from the canister to the purge passage; and perform rapid heating control to heat the motor part and the circuit part when a condition for the purge control is satisfied.

10. The vaporized-fuel treating apparatus according to claim 9, wherein the controller is configured to perform the rapid heating control when a purge concentration of the purge gas in the purge passage is equal to or larger than a predetermined value.

11. The vaporized-fuel treating apparatus according to claim 1, wherein
 the canister includes an atmosphere port and a purge port, and
 the canister is configured to cause a fluid that flows in the canister to pass through in a U-shaped flow path from the atmosphere port to the purge port.

12. The vaporized-fuel treating apparatus according to claim 1 further comprising a controller configured to estimate a purge concentration of the purge gas based on a differential pressure between a front and a rear of the pump part.

* * * * *